United States Patent
Jing

(10) Patent No.: US 11,397,975 B2
(45) Date of Patent: *Jul. 26, 2022

(54) METHOD AND SYSTEM FOR AUTHENTICATING GENUINE PRODUCTS FOR ONLINE SHOPPING

(71) Applicant: Claire Xiao Yan Jing, Eastvale, CA (US)

(72) Inventor: Claire Xiao Yan Jing, Eastvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,712

(22) Filed: Mar. 17, 2020

(65) Prior Publication Data

US 2020/0219158 A1 Jul. 9, 2020

Related U.S. Application Data

(63) Continuation-in-part of application No. 16/581,723, filed on Sep. 24, 2019, now Pat. No. 11,216,856, which is a continuation of application No. 14/819,391, filed on Aug. 5, 2015, now Pat. No. 10,467,667.

(51) Int. Cl.
*G06Q 30/00* (2012.01)
*G06Q 30/06* (2012.01)

(52) U.S. Cl.
CPC .................. *G06Q 30/0609* (2013.01)

(58) Field of Classification Search
None
See application file for complete search history.

(56) References Cited

U.S. PATENT DOCUMENTS

| 7,780,081 B1* | 8/2010 | Liang | G06Q 30/0633 |
| | | | 235/383 |
| 2016/0042415 A1* | 2/2016 | Min | G06Q 30/0613 |
| | | | 705/26.4 |
| 2016/0155127 A1* | 6/2016 | Hartman | G06Q 20/18 |
| | | | 705/18 |

FOREIGN PATENT DOCUMENTS

WO   WO-0229508 A2 * 4/2002 ............. G06Q 30/06

OTHER PUBLICATIONS

Van Mieghem, Jan A., "Peapod: Mass Customized Service", Kellogg School of Management, Northwestern University, Aug. 28, 2001 (Rev. Nov. 22, 2004), 13 pages. (Year: 2004).*

* cited by examiner

*Primary Examiner* — Naeem U Haq
(74) *Attorney, Agent, or Firm* — Raymond Y. Chan; David and Raymond Patent Firm

(57) ABSTRACT

A method of authenticating genuine products in an online shopping platform, including the steps of informing a buying agent about an online shopping order; giving a unique identification mark to the targeted product by a unique and non-replaceable identification item; videotaping at least one of the steps of purchasing the targeted product by the buying agent at the designated store and placing the unique and non-replaceable identification item to provide a video stream; and allowing the buyer to have access to the video stream.

34 Claims, 16 Drawing Sheets

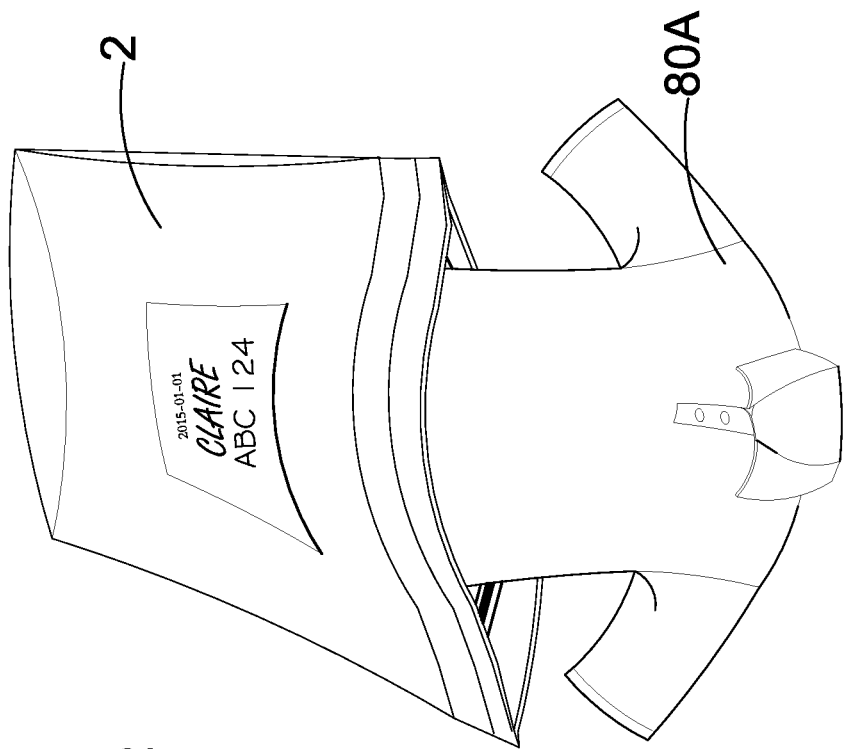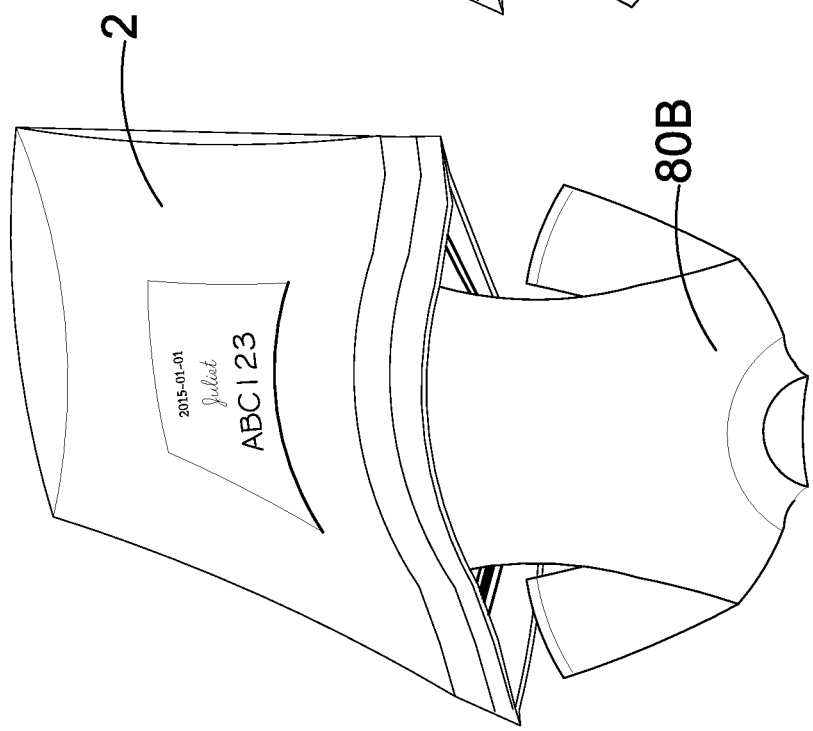
FIG.4

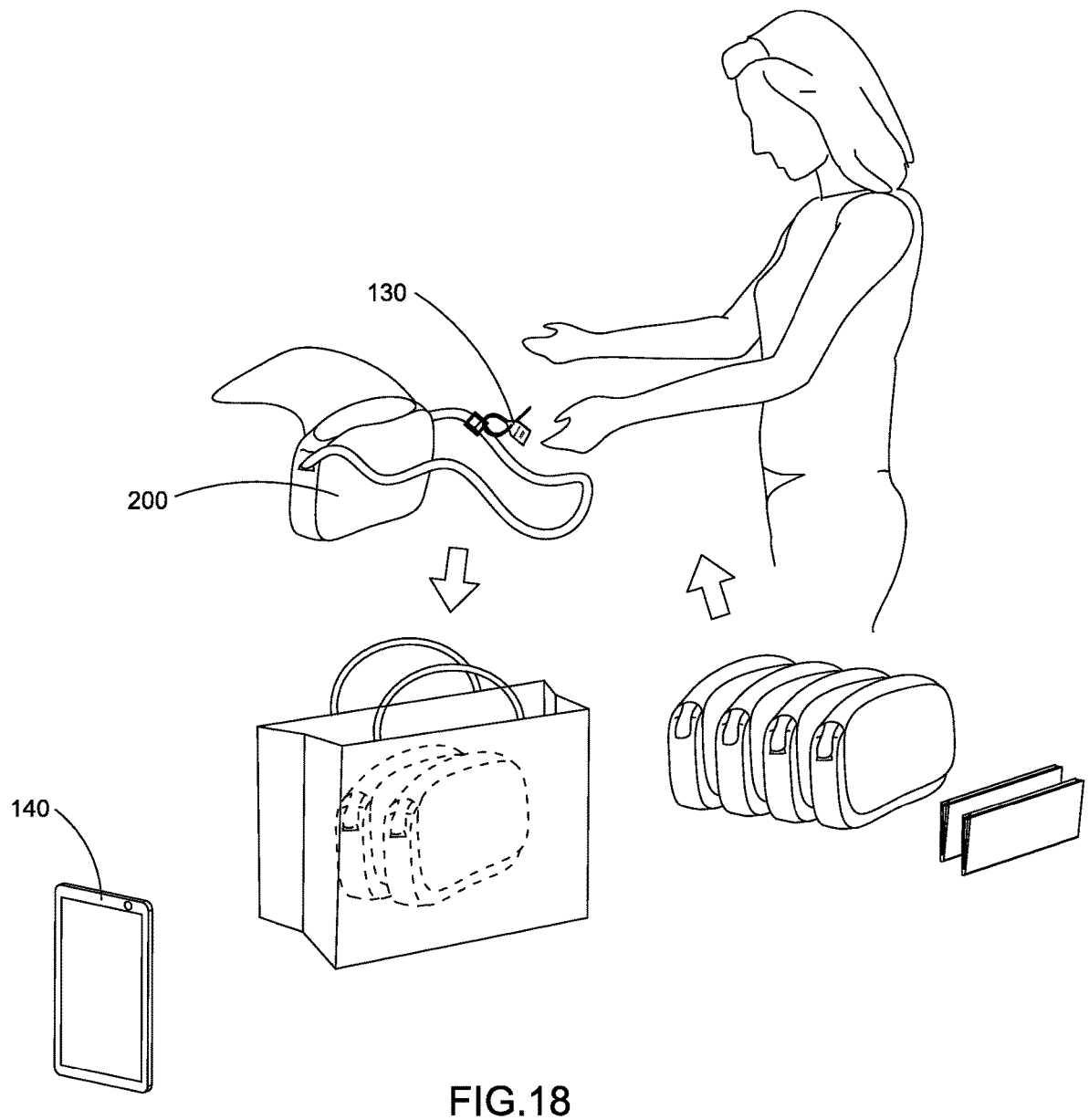

FIG.18

(I) giving a unique identification mark to a targeted product 200 which is bought from a designated online store by a unique and non-replaceable identification item 130

(II) videotaping at least one of the steps of receiving the targeted product 200 which is shipped to a buying agent and placing the unique and non-replaceable identification item 130 by the video capturing device 140 to provide a video stream (III) allowing the buyer to have access to the video stream

METHOD AND SYSTEM FOR AUTHENTICATING GENUINE PRODUCTS FOR ONLINE SHOPPING

CROSS REFERENCE OF RELATED APPLICATION

This application is a Continuation-In-Part application that claims the benefit of priority under 35 U.S.C. § 120 to a non-provisional application, application Ser. No. 16/581, 723, filed Sep. 24, 2019, which is a Continuation application that claims the benefit of priority under 35 U.S.C. § 120 to a non-provisional application, application Ser. No. 14/819, 391, filed Aug. 5, 2015, which are incorporated herewith by references in their entities.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a product authentication, and more particularly to a method and system for authenticating genuine products on online shopping platforms.

Description of Related Arts

Online shopping has substantially replaced conventional store shopping throughout the world. One advantage of online shopping is that a buyer may shop at any time and from anywhere. A buyer may simply stay home and browse through a wide selections of products via Internet. When a particular product is desirable, the buyer may make a purchase decision over the Internet and make a corresponding payment online. When a payment has been made, the order will be further processed and the corresponding product is shipped to a designated address within a predetermined timeframe.

Conventionally, sellers may set up an online shopping platform which may list a number of products and contain detailed product information and shipment methods. A particular seller may establish their own direct shopping platform so that a buyer may establish their own direct shopping platform so that a buyer may order a particular product from that seller. For example, the online shopping platform may be established by a store so that a buyer who makes purchases through the store's online shopping platform is confident that he or she is buying from a trusted seller.

On the other hand, sellers may join a third-party online shopping platform and list their products on that platform. The online shopping platform may act as an intermediary agent for monitoring transactions.

Another online shopping model is that a number of buying agents may receive orders from buyers and help them to purchase products from designated stores. For example, a buyer may make an order online to a buying agent who will actually go to a store to make a corresponding purchase. After making the purchase, the product may then be shipped to the buyer. In this particular online shopping model, instead of making purchase directly from a seller, a buyer "hires" a buying agent to go to a designated store to make the purchase.

One disadvantage of the online shopping model discussed above is that the buyers are unable to verify that the product they actually receive is the product they ordered. For example, if a buyer hires a buying agent to go to a designated store and purchase a pair of shoes which is a limited edition of particular model. The buying agent may go to the store, make the purchase, and ship the shoes to the buyer. When the buyer has received the shoes, the buyer has no reason to know if the pair of shoes he or she receives is a genuine product and bought from an authorized or trusted seller (i.e. the designated store).

Moreover, many online shopping platforms claim to sell luxurious products. The sellers claim to have purchased the luxurious products online. A common defect of this online shopping model is that the buyers do not know the real origin of the products, and they generally have no effective way to verify the authenticity of the products. As a result, there is a need to develop a method and system for authenticating genuine products on an online shopping platform.

SUMMARY OF THE PRESENT INVENTION

An advantage of the present invention is to provide a method and a system for authenticating genuine products on online shopping platforms.

Another advantage of the present invention is to provide a method and a system for authenticating genuine products on online shopping platforms, in which a buyer is able to ascertain the product he or she actually receives is the product he or she ordered.

Another advantage of the present invention is to provide a method and a system for authenticating genuine products on online shopping platforms, wherein an unique non-replaceable identification item can be provided to a targeted product or can be provided to a packaging member of the targeted product by a buying agent, so as to help the buyer to authenticating the targeted products bought through the online shopping platforms.

Another advantage of the present invention is to provide a method and a system for authenticating genuine products on online shopping platforms, wherein the buyer can view a video of a process of attaching the unique non-replaceable identification item to the targeted product or the packaging member to ascertain that the buyer is buying a genuine product from the designated store.

Another advantage of the present invention is to provide a method and a system for authenticating genuine products on online shopping platforms, wherein the video of a purchasing process of the targeted product and the process of placing the unique non-replaceable identification item can be live broadcasting to the buyer, so that the buyer is able to monitor the purchase process and the identification item attaching process.

Another advantage of the present invention is to provide a method and a system for authenticating genuine products on online shopping platforms, wherein according to some embodiments, the buyer can ascertain that the targeted product which is bought from an online store by a buying agent is a genuine product.

In one aspect of the present invention, it provides a method of authenticating genuine products on an online shopping platform, comprising the steps of:

(a) receiving an online shopping order from a buyer through the online shopping platform, the order having information about a targeted product and a designated store;

(b) purchasing the targeted product at designated store by a buying agent;

(c) putting a unique and non-replaceable identification item on the targeted product when the purchase transaction is completed;

(d) videotaping at least one of the steps of selecting the targeted product by the buying agent, the purchasing of the targeted product at the designated store, and putting the unique and non-replaceable identification item on the targeted product;

(e) making the video captured in the step (d) accessible to the buyer of the targeted product.

In another aspect of the present invention, it provides an online shopping system, comprising:

a server configured to generate an online shopping interface;

a terminal linked to the server for accessing the online shopping interface through Internet, the terminal being arranged to receive online shopping order, the order having information about a targeted product and a designated store;

a unique and non-replaceable identification item for being formed on the targeted product which is purchased from the designated store;

a video capturing device arranged to visually capture at least one of a purchase transaction process of the targeted product at the designated store, and a process by which the unique and non-replaceable identification item is put to the targeted product; and a recording medium storing a video captured by the video capturing device.

In another aspect of the present invention, it provides a system of authenticating a targeted product which is bought by a buying agent at a designated store for a buyer, where in the system comprises a server, an agent terminal, a unique and non-replaceable identification item and a video capturing device. The sever is configured for providing an online shopping platform. The agent terminal which is linked to said server to receive an online shopping order having information about the buyer, the targeted product and the designated store. The unique and non-replaceable identification item is arranged for identification of the targeted product. The video capturing device is arranged for capturing at least one of the steps of purchasing the targeted product by the buying agent at the designated store and placing said unique and non-replaceable identification item to provide a video stream that is provided for being viewed by the buyer.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 4 is an alternative example of the unique and non-replaceable identification item according to a preferred embodiment of the present invention.

FIG. 18 is a perspective view illustrating a step of placing the unique and non-replaceable identification item according to the above another preferred embodiment of the present invention.

FIG. 19 is a block diagram illustrating a method of authenticating genuine products for an online shopping platform according to a third preferred embodiment of the present invention.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
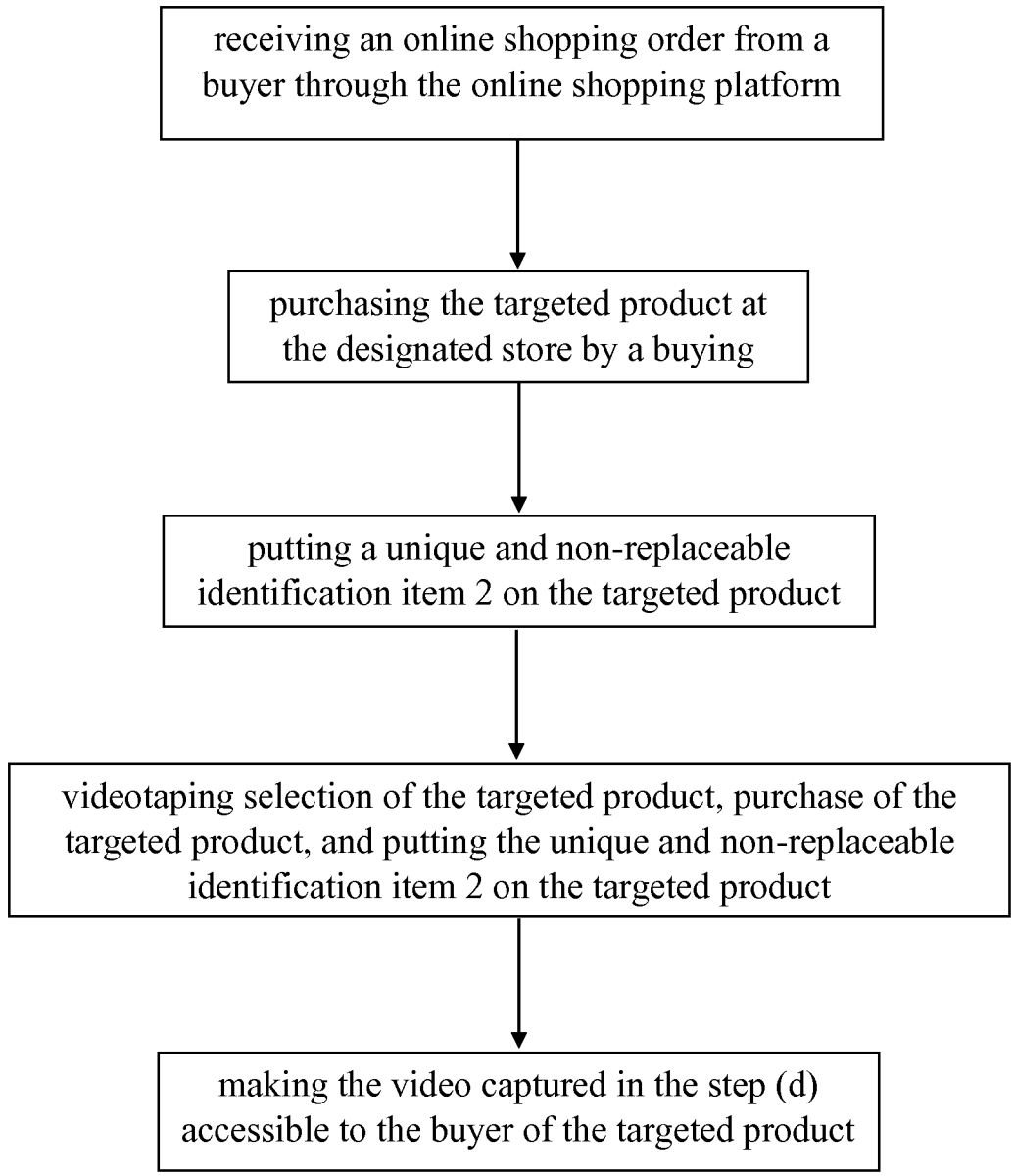
FIG. 1 is a block diagram illustrating a method of authenticating genuine products for an online shopping platform according to a preferred embodiment of the present invention.
Figure 2:
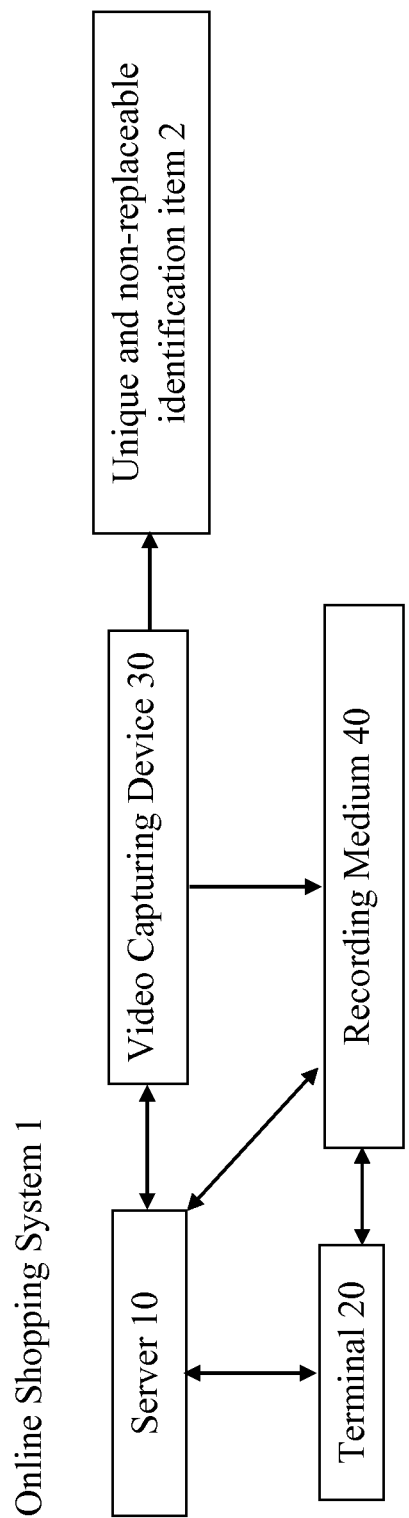
FIG. 2 is a schematic diagram illustrating an online shopping system which implements the method of authenticating genuine products according to a preferred embodiment of the present invention.

Referring to FIG. 1 to FIG. 2 of the drawing, a method of authenticating genuine products on an online shopping platform 1 according to a preferred embodiment of the present invention is illustrated. Broadly, the method may comprise the steps of:

(a) receiving an online shopping order from a buyer through the online shopping platform, the order having information about a targeted product and a designated store;

(b) purchasing the targeted product at the designated store by a buying agent;

(c) putting a unique and non-replaceable identification item 2 on the targeted product when the purchase transaction is completed;

(d) videotaping at least one of the steps of selecting of the targeted product by the buying agent, the purchase of the targeted product at the designated store, and putting the unique and non-replaceable identification item 2 on the targeted product; and (e) making the video captured in the step (d) accessible to the buyer of the targeted product.

The online shopping platform may be set up by an online shopping system 1. The online shopping system may comprise a server 10, a terminal 20 which may be a buyer's computer, the unique and non-replaceable identification item 2 mentioned above, a video capturing device 30, and a recording medium 40. The details of each of these components will be described below.

In step (a), the online shopping order may b e for hiring a buying agent to go to a designated store (such as an outlet store) and make a purchase of a targeted product (such as a woman handbag). The online shopping order may also contain information about a desirable time for the buying agent to go to that designated store. This may be relevant when the buyer wishes to watch a live (i.e. real-time) video about the purchase process (described below).

Step (b) may comprise the steps of:
Physically visiting the designated store by a buying agent at a predetermined time;
Selecting a targeted product from the designated store; and
Completing a purchase transaction for the targeted product at the designated store.

In the last step present above, the purchase transaction may be made at a cashier of the designated store. The buying agent may bring the targeted product to the cashier and complete the relevant purchase transaction process.

Note that step (b) may also be performed online as an alternative. In this alternative mode, step (b) may comprise the steps of:
selecting a targeted product through a designated online shopping system; and
completing a purchase transaction for the targeted product through the designated online shopping system.

In step (c), the unique and non-replaceable identification item 2 may comprise a fastener which may be configured as a fastening strap and designed to be used one time only. The fastener may be attached on the targeted item for identification. Once attached, the fastener which may be configured as a fastening strap and designed to be used one time only. The fastener may be attached on the targeted item for identification. Once attached, the fastener cannot be detached or removed from the targeted product until being destroyed. This ensures that any indication shown on the unique and non-replaceable identification item 2 cannot be unauthorizedly replaced without the knowledge of the buyer once it is attached on the targeted product.

Step (c) may comprise the steps of:
attaching a unique and non-replaceable identification item 2 on the targeted product; and
creating a unique identification pattern on the unique and non-replaceable identification item 2.

The unique identification pattern may be handwritings of certain information concerning the targeted product, or simply a manual signature. For example, the unique identification pattern may be handwritten characters to distinguish one targeted product from another. A simple identification pattern may be a handwritten date, time, the name of the buying agent and the brand of the targeted product. The information may be arranged in particular order to fit different identification or administrative needs. The handwriting may consist of different languages so as to reinforce a uniqueness of the unique pattern. Of course, other unique pattern may also be used as long as the pattern is capable of distinguishing one targeted product or one unique and non-replaceable identification item 2 and the unique identification pattern is to make it very hard for an unauthorized person to duplicate any one of them.

The key to the unique identification pattern is "unique" in the sense that each product contains an identification pattern which is unique for that particular product. For example, a hand signature formed as the unique identification pattern is unique because each hand signature is different. As another example, the handwritten administrative information is unique because the handwritten administrative information is unique because the handwriting and the administrative information are different for different products. A handwriting of "00001 07.28.2015" is unique because of the information conveyed (a serial number and a date) as well as the handwriting style itself. The unique identification pattern must be different and unique for each particular product.

Furthermore, each of the unique identification patterns must be sufficiently and clearly distinguishable from each other. This feature ensures that the buyer who receives the unique and non-replaceable identification item 2 will be confident that the unique identification pattern shown on the unique and non-replaceable identification item 2 cannot be easily imitated. As a result, if the buyer purchases a lot of products, the buyer will be sure that each of the products contains a unique and sufficiently distinct identification pattern. By reviewing the corresponding video in step (e), the buyer will be confident that the product he or she receives is actually the one he or she saw in the video, and no unauthorized switching of product has taken place.

Figure 3:
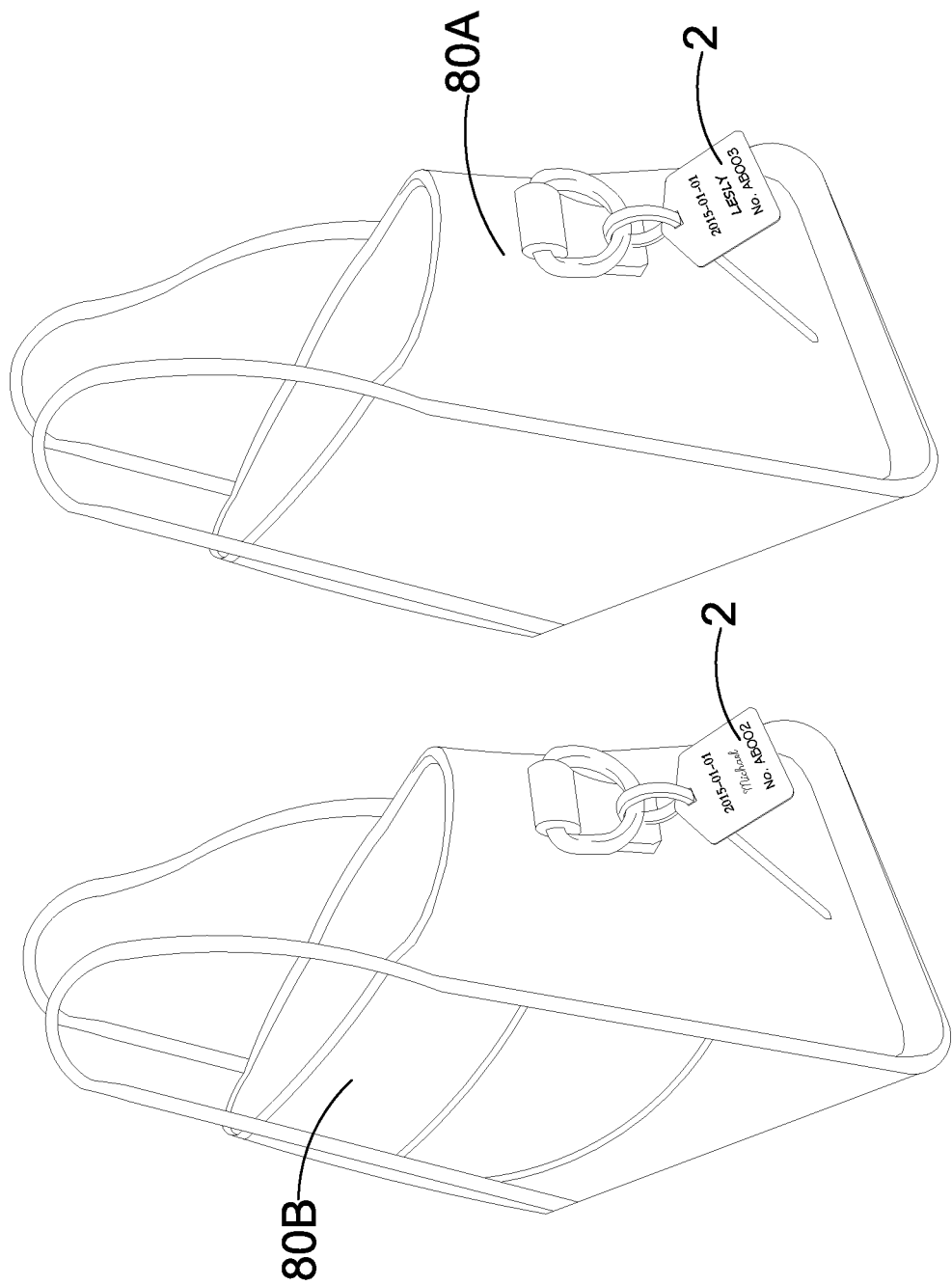
FIG. 3 is a schematic diagram of a unique and non-replaceable identification item according to a preferred embodiment of the present invention.

FIG. 3 to FIG. 4 illustrate two examples of the unique and non-replaceable identification item 2. FIG. 3 illustrates the manner in which a non-replaceable fastener is attached on a woman's handbag (80A, 80B). FIG. 4 illustrates a zipper bag which is arranged to contain a T-shirt (80A, 80B) as a product. Once attached, the zipper bag cannot be removed from the product unless breaking the zipper bag.

For some suitable products, the unique identification pattern may be directly formed on the targeted product. For example, information may be handwritten directly to a package of the targeted product. In this situation, the package of the product may form the unique and non-replaceable identification item 2 while the handwriting is unique in the sense that it cannot be easily duplicated by other persons and forms the unique identification pattern.

Step (d) may comprise the steps of:
videotaping the process of selecting a targeted product at the designated store by the buying agent;
videotaping the payment process of the targeted product at the designated store;
videotaping the actions of attaching the unique and non-replaceable identification item 2, wherein the unique identification pattern must be clearly captured.

The purpose of videotaping the processes mentioned above is to show to the buyer that the targeted product has been properly identified and securely handled. As such, the buyer will be confident that the product he or she selects on the online shopping platform is actually the product that will be shipped to him or her. By attaching the unique and non-replaceable identification item 2 and producing the unique identification pattern thereon, the buyer may verify upon receipt of the targeted product, that the unique and non-replaceable identification item 2 and the unique identification pattern are the ones which were videotaped at the time of purchase. The buyer may compare the unique identification pattern on the targeted product with the one shown on the video mentioned in step (d) and step (e) above. These steps prevent unauthorized person to switch the targeted product.

Step (d) may further comprise a step of videotaping a corresponding reference medium and a purchasing receipt of the targeted product so as to verify that a date shown on the reference medium matches with the date of the purchasing receipt.

The purpose of this step is to allow the buyer to verify a genuine and correct purchase date of the targeted product. The reference medium may be newspapers. Since newspapers show the date information, if the date shown on the newspapers matches with the date shown on the purchasing receipt, the buyer can verify a genuine and correct purchase date of the targeted product. The reference medium may be newspapers. Since newspapers show the date information, if the date shown on the newspapers matches with the date shown on the purchasing receipt, the buyer will be confident that the correct purchase date is the date shown on the purchasing receipt, and the date is captured by the video mentioned in step (d). It is worth mentioning that other reference mediums may also be used as long as the reference medium contains the actual date when the targeted product is purchased. For example, the reference medium may include a predetermined screen of a smartphone which shows the current date and time.

Step (e) may comprise the steps of:
uploading the video captured in step (e) to the server 10 which may have a recording medium 40 to store the video; and
allowing access of the uploaded video by the buyer of the corresponding targeted product.

The purpose of step (e) is to allow the buyer to conveniently gain access to the video, the buyer may verify the information indicated on the unique and non-replaceable identification item 2. If the information matches with the information shown in the video, the buyer will be confident that the product that he has received is the actually the one shown in the video and no unauthorized person has switched the product to another. The server 10 may be a computer which provides a cloud drive for storing the video captured in step (d).

As an alternative mode, the video may also be stored into a physical medium which is distributed to the buyer. So, step (e) may comprise the steps of:
storing the video captured in step (d) into a recording medium 40; and
distributing the recording medium 40 to the buyer.

As a further alternative, step (e) may comprise the step of live broadcasting the video to the buyer through a predetermined communication network so that the buyer may monitor the entire purchase process and the process by which the unique identification pattern is created on the unique and non-replaceable identification item 2.

The recording medium 40 may be any conventional storage medium for video files. For example, the storage medium may be a DVD. The video captured in step (d) may be saved in a predetermined video format and burnt to the DVD. The DVD may then be distributed (such as by mailing) to the buyer. Instead of mailing a physical DVD to the buyer, the video (in the form of a video stream) may also be distributed to the buyer through specific email accounts.

When the recording medium 40 is linked to the server 10, the recording medium may be a hard disk which is capable of storing a predetermined amount of videos. The videos may be made accessible to the buyer through proper authentication and verification.

Referring to FIG. 2 of the drawings, the above-mentioned method may be carried out through an online shopping system 1, which may comprise a server 10 configured to generate an online shopping interface, a terminal 20 linked to the server 10 for accessing the online shopping interface through Internet. The terminal 20 is arranged to receive online shopping order, and the order will have information about a targeted product and a designated store.

The online shopping system 1 may further comprise a unique and non-replaceable identification item 2 for being formed on the targeted product which is purchased from the designated store. The unique and non-replaceable identification item 2 has been described above.

The online shopping system 1 may further comprise a video capturing device 30 arranged to visually capture purchase transaction process of the targeted product at the designated store, and a process by which the unique and non-replaceable identification item 2 is put to the targeted product. The video capturing device 30 may be a video recorder, a smartphone, or any other devices which may be used to capture scenes and produce video.

The online shopping system 1 may further comprise a recording medium 40 for storing the video captured by the video capturing device 30. The recording medium 40 may be a memory device (such as a hard disk) or a DVD. The recording medium 40 will be made accessible to the buyer so that the buyer is allowed to verify the information and the unique identification pattern indicated on the unique and non-replaceable identification item 2.

Figure 5:
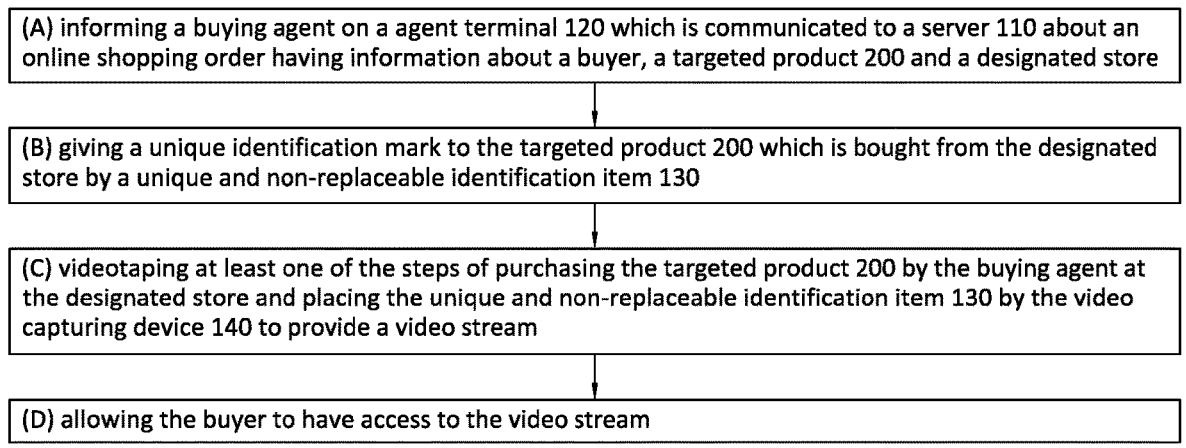
FIG. 5 is a block diagram illustrating a method of authenticating genuine products for an online shopping platform according to another preferred embodiment of the present invention.
Figure 6:
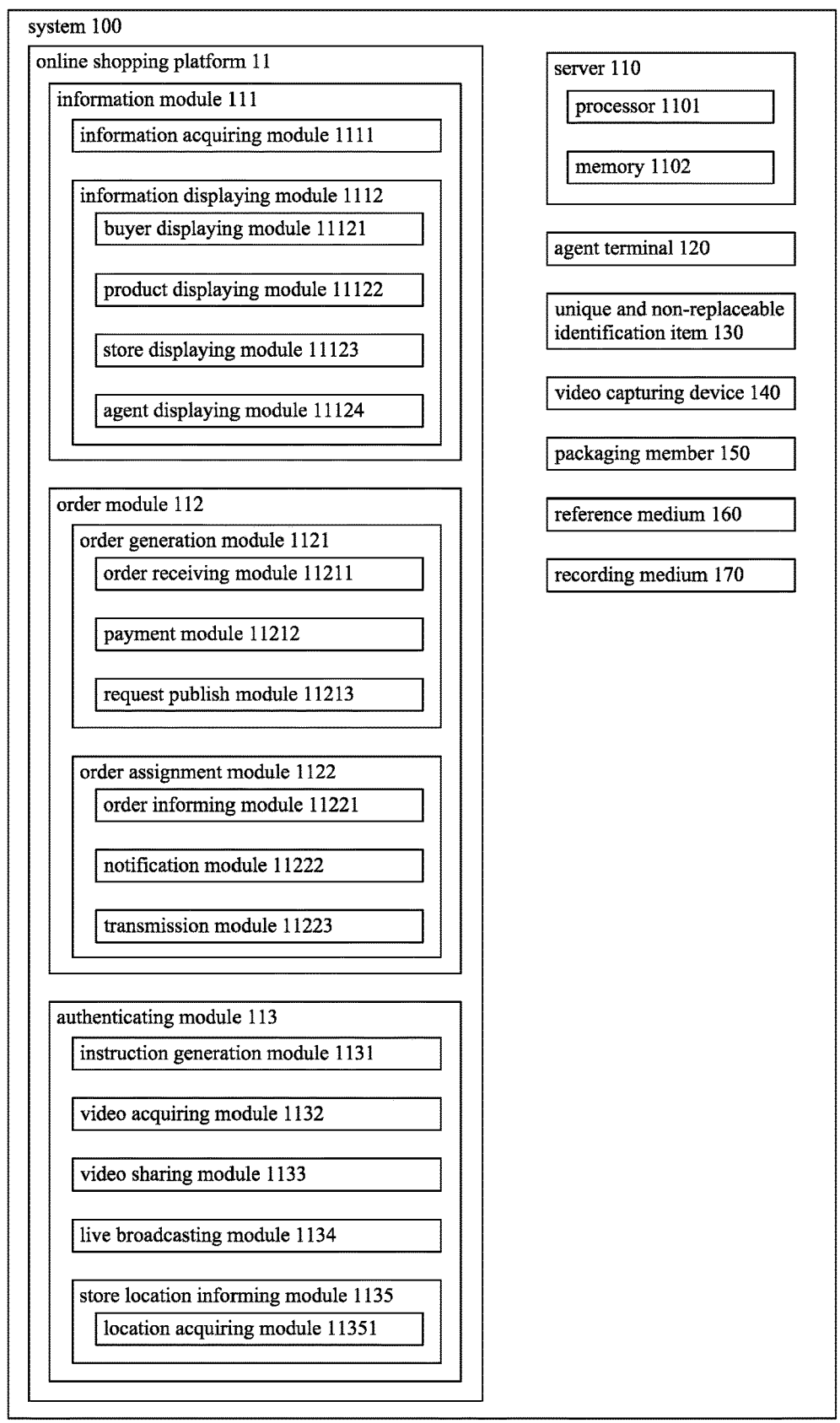
FIG. 6 is a schematic diagram illustrating an online shopping system which implements the method of authenticating genuine products according to the above another preferred embodiment of the present invention.

Referring to FIG. 5 and FIG. 6 of the drawings, a system 100 and a method of authenticating a genuine product for an online shopping platform 11 on a server 110 according to another preferred embodiment of the present invention are illustrated. Accordingly, a buyer may designate a buying agent to buy a targeted product 200 of a designated store for him or her. The system 100 comprises a sever 110 providing the online shopping platform 11, an agent terminal 120 which is capable of being communicated and linked to the server 110, a unique and non-replaceable identification item 130 arranged for identification of a targeted product 200 which is purchased from a designated store, a video capturing device 140, and the method comprises the following steps:

(A) informing the buying agent on the agent terminal 120 which is communicated to the server 110 about an online shopping order having information about the buyer, the targeted product 200 and the designated store;

(B) giving a unique identification mark to the targeted product 200 which is bought from the designated store by the unique and non-replaceable identification item 130;

(C) videotaping at least one of the steps of purchasing the targeted product 200 by the buying agent at the designated store and placing the unique and non-replaceable identification item 130 by the video capturing device 140 to provide a video stream; and (D) allowing the buyer to have access to the video stream.

Accordingly, the buying agent is able to help the buyer to buy the targeted product 200 from the designated store and then the targeted product 200 is shipped to the buyer. The buyer and the buying agent can be in different geographical areas of a country, or they are in different countries. Therefore, the buyer is not required to pay a visit to a geographical area which is far away from him when he or she wants to buy a desired product from the designated store at the corresponding geographical area. According to the present invention, the buyer is simply not convenient or does not want to buy the targeted product 200 at the designated store and can ask the buying agent to visit the designated store to buy the targeted product 200 and ship the targeted product 200 to him or her.

The targeted product 200 comprises but not limited to a clothing, a pair of shoes, a bag, a case, a jewelry, a watch, a cosmetics product, a musical instrument, and an electronic product such as a cell phone, a computer, a wearable smart device, a camera and a speaker. The person of ordinary skilled in the art shall understand that the targeted product can be any type of products that can be shipped to the buyer.

The method of this preferred embodiment of the present invention further comprises a step of receiving the online shopping order having information about the buyer, the targeted product 200 and the designated store from the buyer through the online shopping platform 11 on the server 110. And then, when the agent terminal 120 has received the online shopping order from the online shopping platform 11 on the sever 110, the buying agent physically pays a visit to the designated store to buy the targeted product 200 for the buyer.

The online shopping platform 11 may display an inventory of a plurality of selectable products and corresponding available stores which sell the products, and the buyer may browse the corresponding contents and submit the online shopping order to the online shopping platform 11 by picking out the targeted product 200 at the designated store from the displayed inventory of the plurality of selectable products and making a payment directed to the targeted product 200 at the designated store.

Correspondingly, the method of this preferred embodiment of the present invention further comprises a step of displaying the inventory of the plurality of selectable products and corresponding stores on the online shopping platform 11 for the buyer to select his or her desired targeted product 200.

Alternatively, the buyer may browse an online store of a certain type of products and pick out his or her desired targeted product 200, and then the buyer can log on the online shopping platform 11 of the present invention to publish a buying request of the targeted product 200 at the designated store. The buying agent which is capable of accomplishing the buying task requirement of the buyer may answer and accept the buying request, and then the buyer can make the online shopping order having information about the buyer, the targeted product 200 and the designated store and also make a payment to the buying task requirement associated with the online shopping order. The buying agent then physically goes to the designated store to buy the targeted product 200 for the buyer.

Accordingly, the method of this preferred embodiment of the present invention further comprises the steps of publishing a buying request from the buyer about the targeted product 200 at the designated store on the online shopping platform 11 and generating the online shopping order having information about the buyer, the targeted product 200 and the designated store when the buying agent confirms to accomplish the buying request of the buyer and the buyer makes a payment associated with the buying request, then the buying agent is informed with the online shopping order on the agent terminal 120.

According to this preferred embodiment of the present invention, the online shopping platform 11 will receive the online shopping order from the buyer and then inform the buying agent about the online shopping order. Accordingly, the online shopping platform 11 may directly display the online shopping order for the buying agent to view, or a notification message is sent to a buyer account of the buyer on the online shopping platform 11 and the buying agent may log onto the online shopping platform 11 with his or her account and password to have a view of detailed information about the online shopping order. Alternatively, information of the online shopping order may be directly sent to the agent terminal 120 of the buying agent through a network which is preferably a wireless communication network.

In other words, the step (A) of the method may comprise a step of displaying the online shopping order on the online shopping platform 11 in such a manner that the buying agent is able to view the online shopping order on the agent terminal 120. Alternatively, the step (A) may comprise the steps of sending a notification message to buying agent and representing detailed information about the online shopping order when the buyer log on the online shopping platform 11 through the agent terminal 120. Alternatively, the step (A) may comprise a step of sending information of the online shopping order to the agent terminal 120 through a wireless network communicating the sever 110 with the agent terminal 120.

A plurality of the buying agents may be registered on the online shopping platform 11, the buyer may view information of the plurality of the buying agents such as age, gender, living address, and completed orders about certain products, information of available designated stores associated with a designated buying agent, and information of available time for the designated buying agent, so that the buyer is able to pick out a suitable buying agent.

Particularly, the buyer may further be able to view specialty information of the plurality of buying agents. In other words, the buying agents may have varied background and they may have different specialties on different types of products. For instance, one buying agent is good at picking out bags for girls, while another buying agent is more familiar with electronic products. The buyer may send a request to a particular buying agent for a live communication with the particular buying agent on the online shopping platform 11, and after an conversation with the particular buying agent, the buyer may make up his or her mind to choose the desired buying agent for him or her.

In other words, the method of this preferred embodiment of the present invention further comprises the steps of displaying at least one of information of the plurality of buying agents, information of available designated stores of each buying agent, information of available time of each buying agent and information of specialty of each buying agent for the buyer to select his or her desired buying agent.

In an alternative mode, the online shopping order can be made in a live manner. More specifically, the buyer may make a payment for requesting the buying agent to arrive in the designated store, and then the buying agent goes to the designated store and show products in the designates store to the buyer in a live broadcasting video and the buyer can select the targeted product 200 and then make the online shopping order in a live manner.

Correspondingly, the method of this preferred embodiment of the present invention further comprises the steps of receiving a request from the buyer about paying a visit to the designated store by the buying agent, live broadcasting the process of displaying products in the designated store, and receiving the online shopping order from the buyer in a live manner.

In the step (B), the unique and non-replaceable identification item 130 can be placed for identifying the targeted product 200. The unique and non-replaceable identification item 130 can be adhered, connected, fastened, or mounted to the targeted product 200, so that when the targeted product 200 with the unique and non-replaceable identification item 130 is delivered to the buyer, the buyer is able to have a view of the unique and non-replaceable identification item 130 and will be confident that the targeted product 200 bought by the buying agent is the genuine product he or she desires to buy. Particularly, according to the present invention, the process of placing the unique and non-replaceable identification item 130 is recorded by the video capturing device 140, and the video stream is also viewable by the buyer, so that the buyer is able to compare the physical unique and non-replaceable identification item 130, which is reached to the buyer along with the targeted product 200, with the information of the unique and non-replaceable identification item 130 appeared in the video stream, so that the buyer is able to make a judgement that whether the targeted product 200 is a genuine product.

Figure 7:
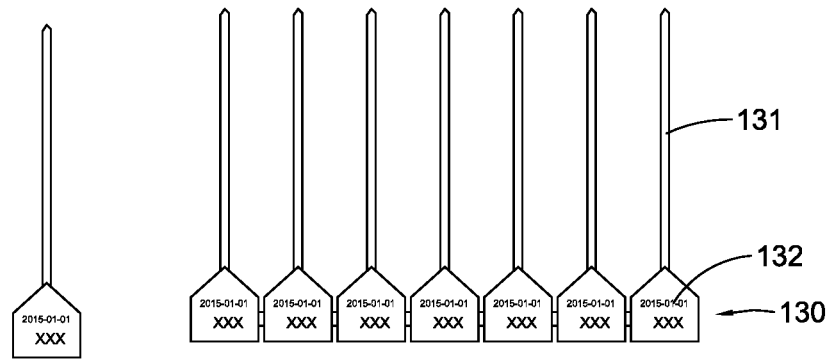
FIG. 7 is a perspective view of a unique and non-replaceable identification item of the online shopping system according to the above another preferred embodiment of the present invention.

As shown in FIG. 7 of the drawings, the unique and non-replaceable identification item 130 of this preferred embodiment can comprise an identification item body 131 and a unique identification pattern 132 formed on the identification item body 131. The unique identification pattern 132 may be a man-made mark such a shape and a character. As is mentioned above, the unique identification pattern 132 of this preferred embodiment can be handwritings of information associated with the targeted product 200, the buyer, or the buying agent.

More specifically, the unique identification pattern 132 may comprise but not limited to at least one of information items 1321 of date, time, name of buying agent which is a manual signature, brand of the targeted product 200, price of the targeted product 200, batch number of the targeted product 200, color of the targeted product 200, address of the designated store, name of the buyer, address of the buyer. In order to enhance the uniqueness of the unique identification pattern 132, the handwritings of the above information can be in different languages, the types of the information used for the unique identification pattern 132 can be random, and the sequence order of these information can be random, so that different targeted products 200 with different unique identification patterns 132 are clearly and apparently distinguishable from each other, and an unauthorized person is impossible to duplicate the unique identification pattern 132.

In addition, in the step (B), the unique and non-replaceable identification item 130 can be placed to the targeted product 200. Alternatively, the system 100 further comprises a packaging member 150 arranged for packing the targeted product 200, and the unique and non-replaceable identification item 130 can be placed to the packaging member 150. Therefore, the unique and non-replaceable identification item 130 can be shipped to the buyer along with the targeted product 200 or the packaging member 150 for helping to prove the authenticity of the targeted product 200.

Accordingly, the step (B) of the present invention may comprise a step of disposing the unique and non-replaceable identification item 130 in the targeted product 200, or a step of attaching the unique and non-replaceable identification item 130 to the targeted product 200, or a step of disposing the unique and non-replaceable identification item 130 in the packaging member 150 of the targeted product 200, or a step of attaching the unique and non-replaceable identification item 130 to the packaging member 150 of the targeted product 200.

In some embodiments, the person of ordinary skilled in the art can understand that the packaging member 150 is subject to one-time use and thus can function as the unique and non-replaceable identification item 130.

The unique and non-replaceable identification item 130 may be a sensor element which comprises but not limited to a position sensor element such a GPS sensor element, a temperature sensor element, a humidity sensor element, an air quality sensor element, a gyro element, an image sensor element, a pressure sensor element. The data information of the sensor element can be wirelessly sent to the sever 110 and is accessible to the buyer on the online shopping platform 11, the data information helps the buyer to monitor the transportation of the targeted product and also functions as a unique and non-replaceable identification data for identifying the targeted product 200.

As a specific example, the sensor element is a GPS sensor element, when the buying agent buys the targeted product 200 at the designated store, the GPS sensor element is put to the targeted product 200 and is activated. The GPS sensor element is able to obtain the position information of the designated store, and then the GPS sensor element is in operation during the shipment of the targeted product 200 and sending real-time position information to the server 110, so that the buyer is able to obtain the position of the targeted product 200 through the online shopping platform 11.

Figure 8:
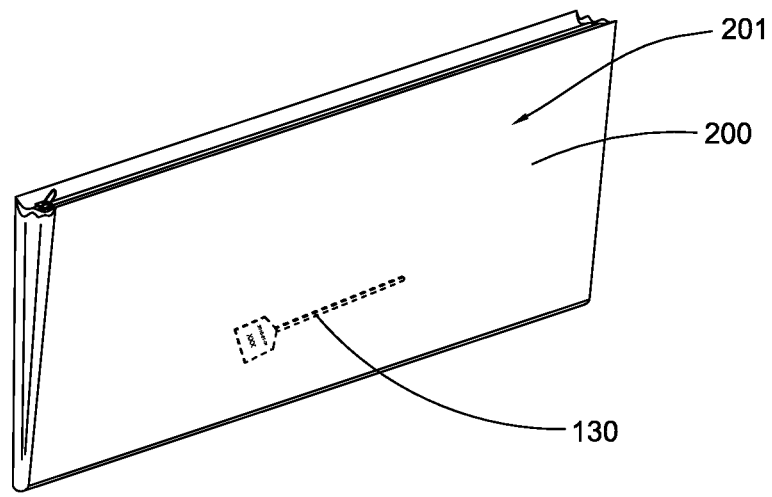
FIG. 8 is a perspective view illustrating the unique and non-replaceable identification item of the online shopping system being disposed in a targeted product according to the above another preferred embodiment of the present invention.
Figure 9:
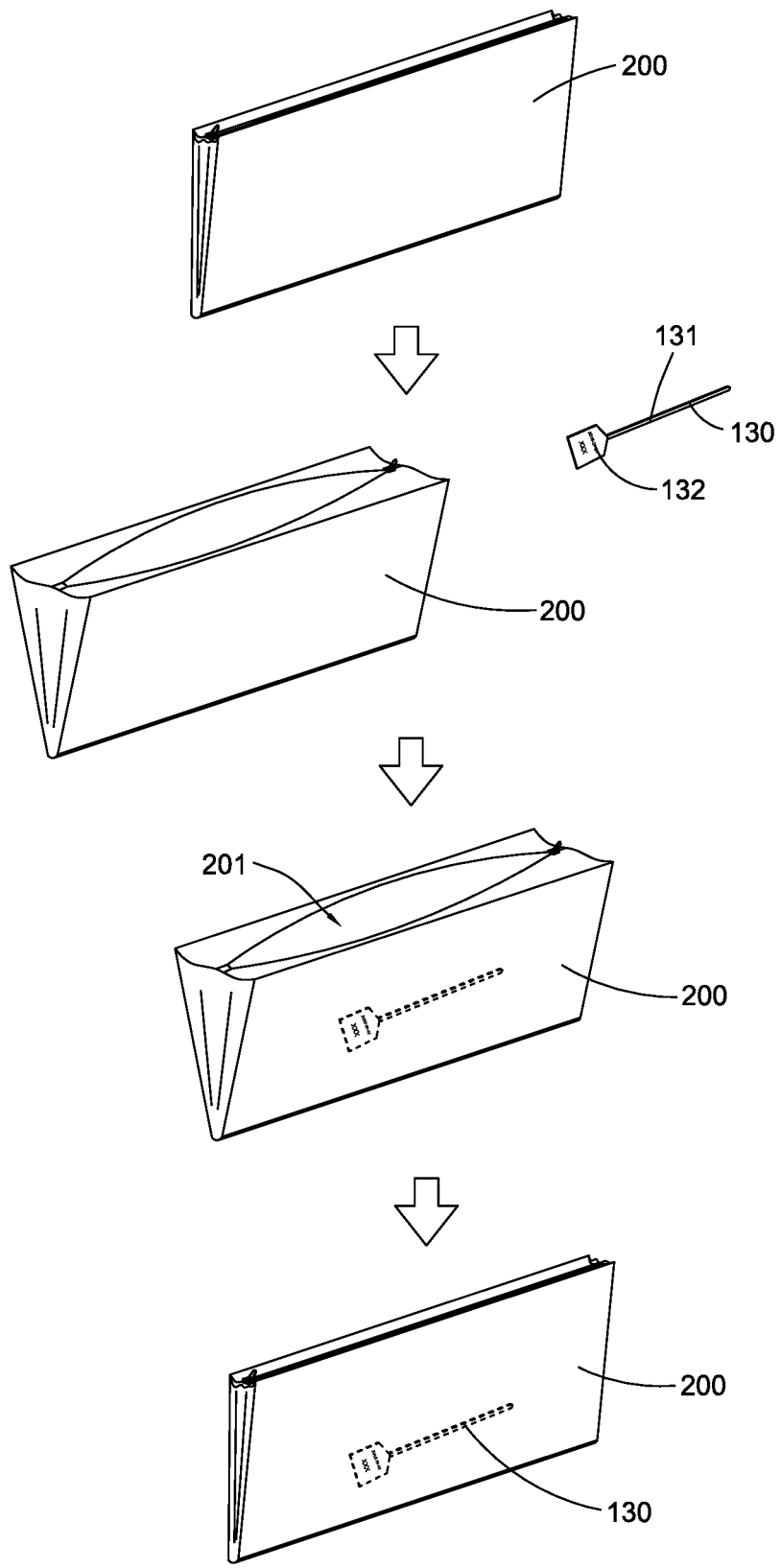
FIG. 9 is a schematic view illustrating a process of disposing the unique and non-replaceable identification item of the online shopping system into a targeted product according to the above another preferred embodiment of the present invention.

The unique and non-replaceable identification item 130 may be disposed in the targeted product 200, as shown in FIG. 8 and FIG. 9 of the drawings, the targeted product 200 is embodied as a wallet having an accommodation cavity 201. When the buying agent has bought the wallet from the designated store, the wallet can be opened to expose the accommodation cavity 201, and the unique and non-replaceable identification item 130 having the unique identification pattern 132 can then be disposed into the accommodation cavity 201 of the wallet, the process of disposing the unique and non-replaceable identification item 130 into the wallet is recorded in the video stream and when the wallet is transported and shipped to the buyer, the buyer is able to take out the unique and non-replaceable identification item 130 from the wallet and thus can confirm that the wallet he or she receives is the targeted product 200 that he or she wants to buy.

Figure 10:
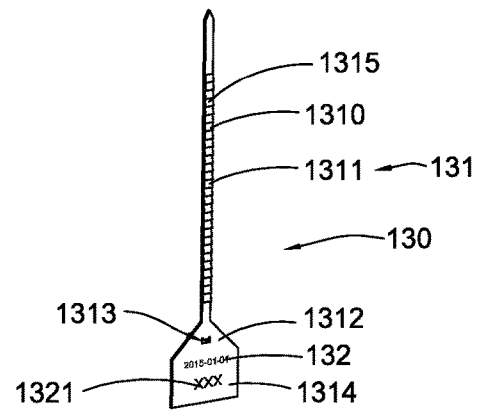
FIG. 10 is a perspective view of an alternative mode of the unique and non-replaceable identification item of the online shopping system according to the above another preferred embodiment of the present invention.

As shown in FIG. 10 of the drawings, the unique and non-replaceable identification item 130 may comprise the identification item body 131 which is embodied as a fastener 1310 that can be fastened to the targeted product 200. In an embodiment, the fastener 1310 is destroyed when it is detached and removed from the targeted product 200, so that it is unique and can be used for identifying the targeted product 200. According to the embodiment shown in the drawings, the unique and non-replaceable identification item 130 further comprises the unique identification pattern 132 formed on the identification item body 131 which is a fastener 1310 that may not be destroyed when it is detached and removed from the targeted product 200, the identification item body 131 can be just used for fastening the unique and non-replaceable identification item 130 to the targeted product 200, while the uniqueness of the unique and non-replaceable identification item 130 lies on the handwritings of the unique identification pattern 132.

Figure 11:
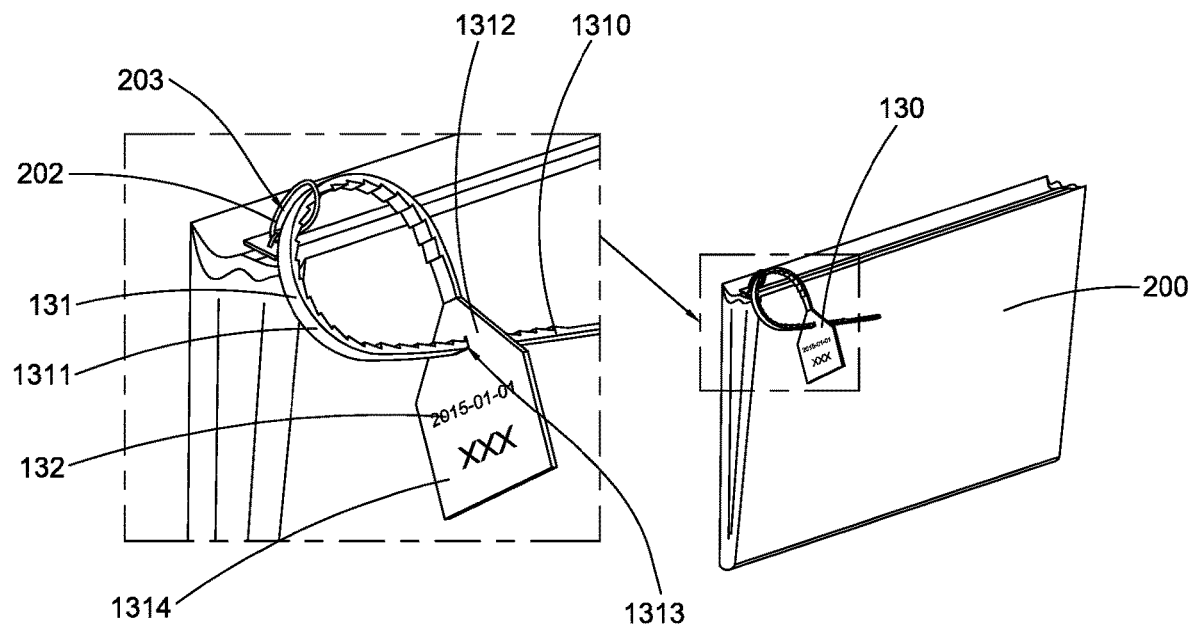
FIG. 11 is a perspective view illustrating the unique and non-replaceable identification item of the online shopping system being fastened to a connector of the targeted product according to the above another preferred embodiment of the present invention.

More specifically, in this example shown in FIG. 10 and FIG. 11 of the drawings, the fastener 1310 comprises a fastening portion 1311, a locking portion 1312 having a locking hole 1313, and an identification portion 1314 that is used for providing an area for forming the handwritings of the unique identification pattern 132. The fastening portion 1311 comprises a plurality of spaced apart locking threads 1315, and the locking portion 1312 is arranged for engaging with the locking threads 1315 when the fastening portion 1311 is inserted through the locking hole 1313 of the locking portion 1312 to align one or more of the locking threads 1315 with the corresponding locking portion 1312.

The targeted product 200 of this example comprises a connector 202 such as a zipper having a hole 203, the fastener 1310 of the unique and non-replaceable identification item 130 can be fastened to the connector 202 by passing through the hole 203 and fixing the fastening portion 1311 with the locking portion 1312.

Figure 12:
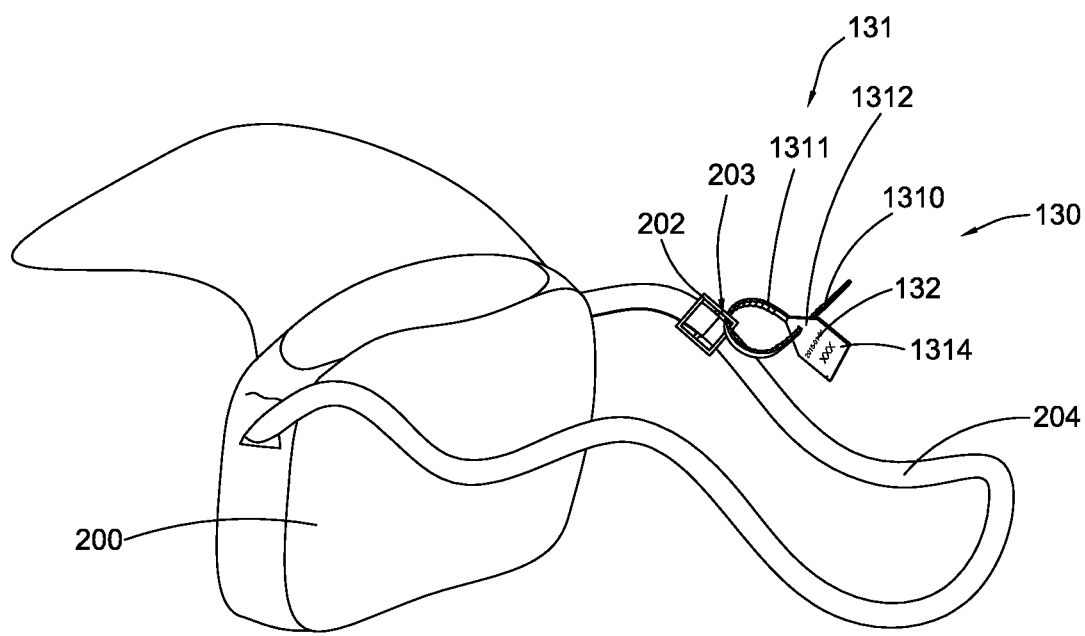
FIG. 12 is a perspective view illustrating the unique and non-replaceable identification item of the online shopping system being fastened to a connector at a handle of the targeted product according to the above another preferred embodiment of the present invention.
Figure 13:
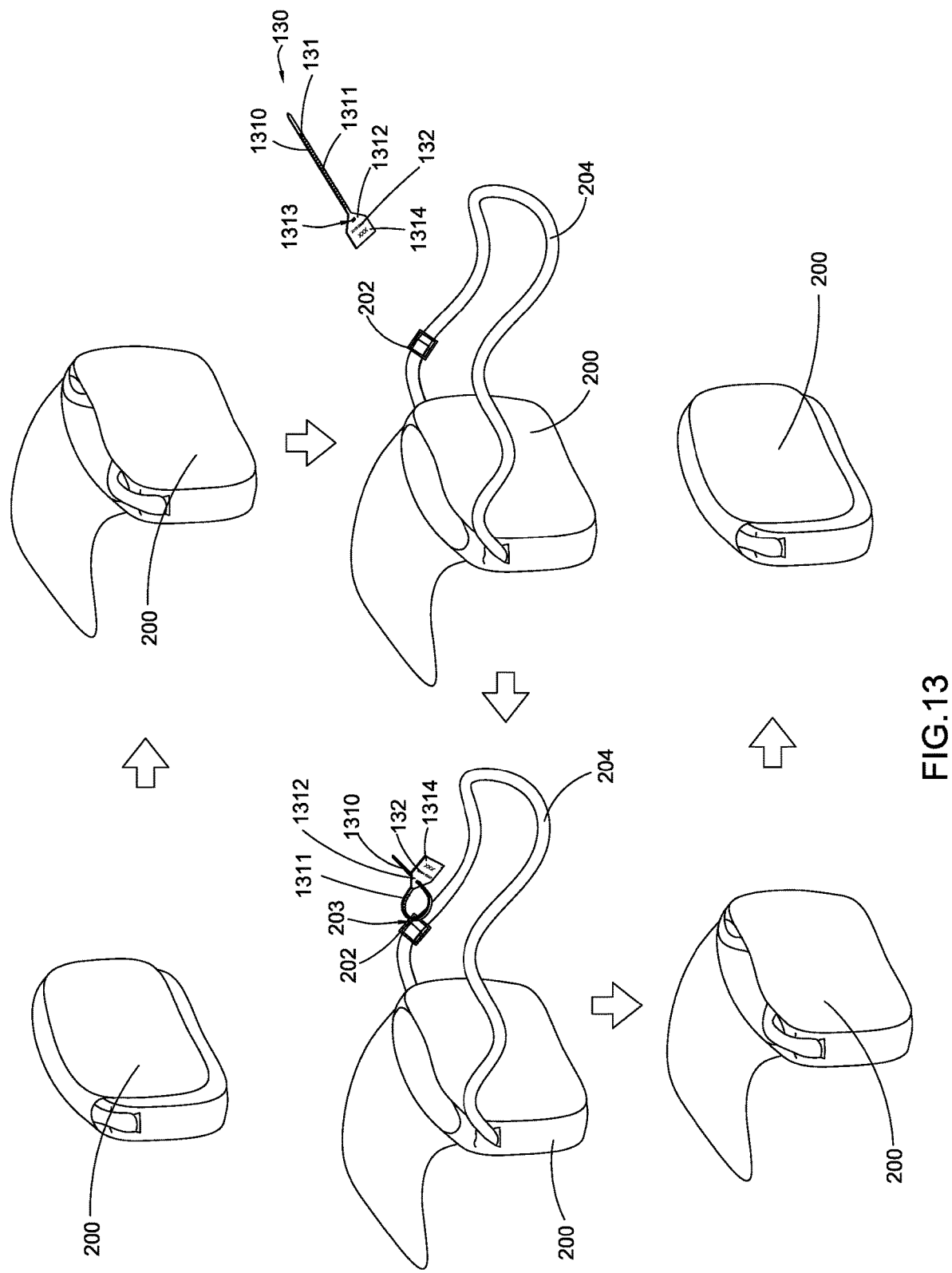
FIG. 13 is a schematic view illustrating the process of attaching the unique and non-replaceable identification item of the online shopping system being to the connector at the handle of the targeted product according to the above another preferred embodiment of the present invention.

Referring to FIG. 12 and FIG. 13 of the drawings, according to another example, the targeted product 200 of this example comprises a handle 204 for a user to hold thereon, and a connector 202 mounted at the handle 204. Similarly, the connector 202 has a hole 203, the fastener 1310 of the unique and non-replaceable identification item 130 can be fastened to the connector 202 by passing through the hole 203 and fixing the fastening portion 1311 with the locking portion 1312, so as to retain the unique and non-replaceable identification item 130 at the connector 202 at the handle 204 of the targeted product 200.

FIG. 13 illustrates the process for placing the unique and non-replaceable identification item 130 to the targeted product 200. The unique and non-replaceable identification item 130 can be fastened to the connector 202 and then the handle 204 can be disposed into a main body of the targeted product 200 to hide the unique and non-replaceable identification item 130.

Figure 14:
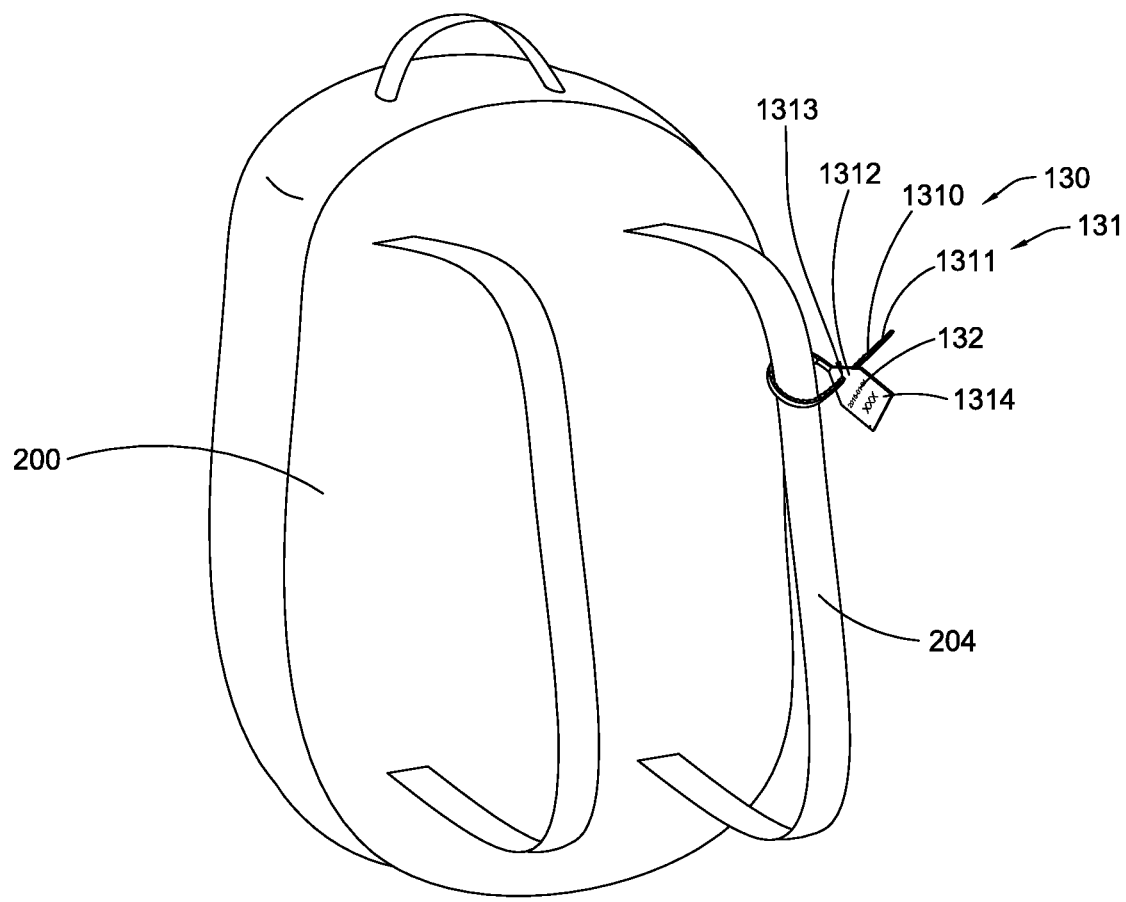
FIG. 14 is a perspective view illustrating the unique and non-replaceable identification item of the online shopping system being fastened to a strap of the targeted product according to the above another preferred embodiment of the present invention.

Referring to FIG. 14 of the drawings, according to another example, the targeted product 200 of this example comprises a strap 205 for a user to wear the targeted product 200 on his or her body, and the unique and non-replaceable identification item 130 can be fastened to the strap 205 by forming a loop structure which is wound around the strap 205.

Figure 15:
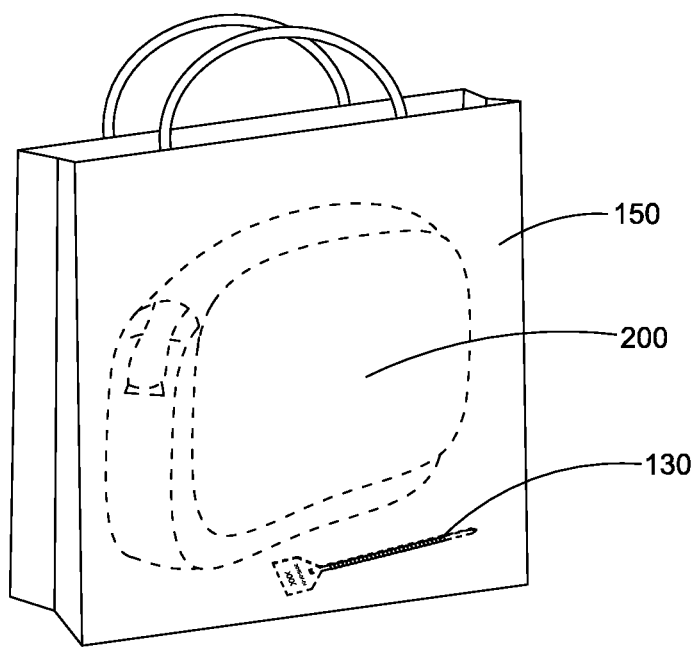
FIG. 15 is a perspective view illustrating the unique and non-replaceable identification item of the online shopping system being disposed in a packaging member of the targeted product according to the above another preferred embodiment of the present invention.
Figure 16:
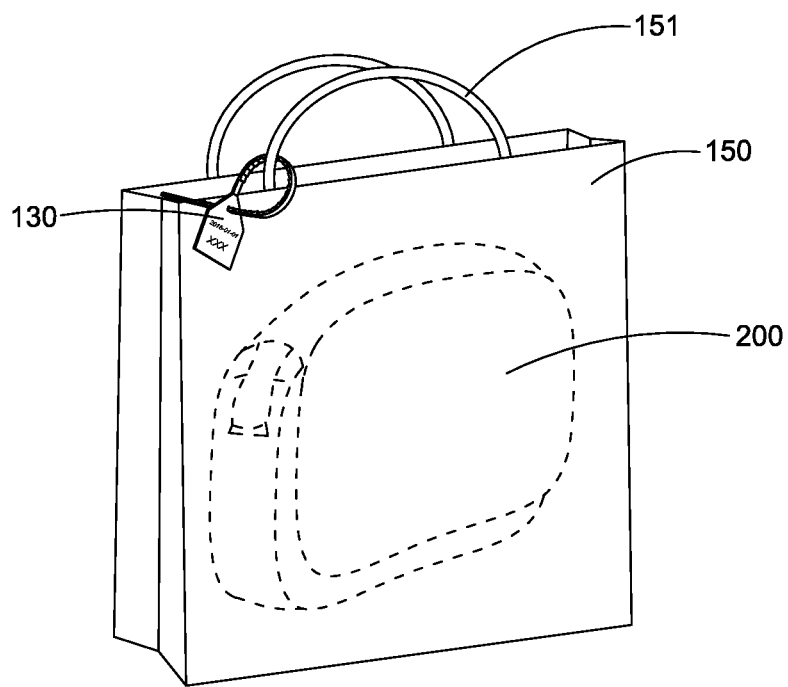
FIG. 16 is a perspective view illustrating the unique and non-replaceable identification item of the online shopping system being attached to the packaging member of the targeted product according to the above another preferred embodiment of the present invention.
Figure 17:
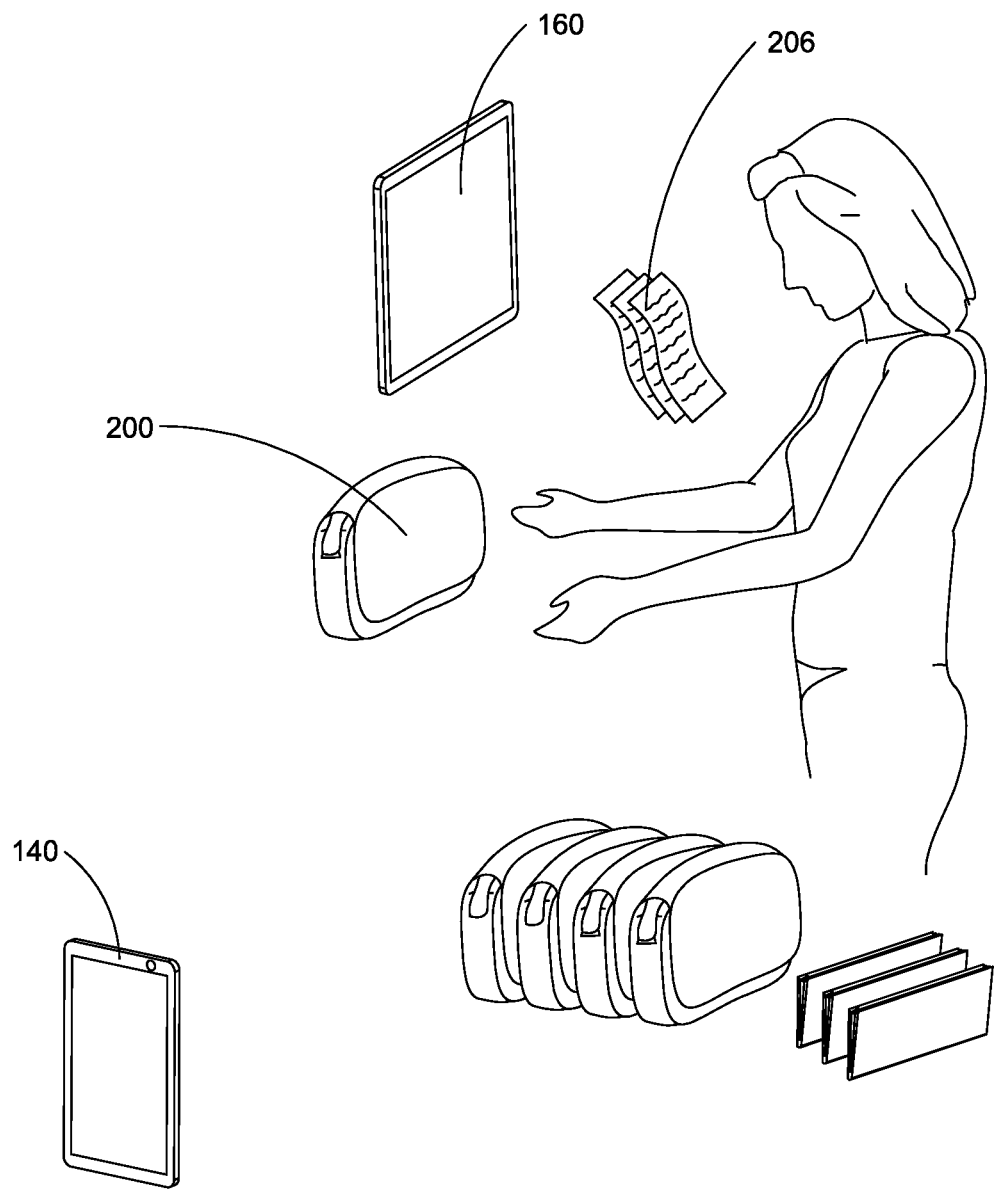
FIG. 17 is a perspective view illustrating a step of videotaping the purchase of the targeted product according to the above another preferred embodiment of the present invention.

Referring to FIG. 15 and FIG. 16 of the drawings, according to another examples, the targeted product 200 is provided with the packaging member 150 which can be a packaging box or a packing bag for packaging the targeted product 200. As shown in FIG. 15, the targeted product 200 is received in the packaging member 150, and the unique and non-replaceable identification item 130 can be disposed in the packaging member 150. When the packing member 150 together with the targeted product 200 is delivered to the buyer, the buyer is able to take out the unique and non-replaceable identification item 130 from the packaging member 150, so that it is affirmed that the targeted product is a genuine product.

As shown in FIG. 16, the targeted product 200 is received in the packaging member 150, and the unique and non-replaceable identification item 130 can be attached to the packaging member 150. Similarly, the packaging member 150 may be provided with fixation element 151 which is a connector, a handle or a strap, the unique and non-replaceable identification item 130 can be fastened to the fixation element 151. As an example shown in FIG. 15, the unique and non-replaceable identification item 130 can be fastened to the fixation element 151 which is handle of a packaging bag. The packaging member 150 with the targeted product 20 may be further placed into an outer packaging box which is provided by a logistics provider. When the outer packaging box, which is disposed with the packing member 150 and the targeted product 200, is delivered to the buyer, the buyer is able to take out the unique and non-replaceable identification item 130 from the outer packaging box, so that it is ensured that the targeted product is a genuine product.

In the step (C), one or more steps of purchasing the targeted product 200 by the buying agent at the designated store and placing the unique and non-replaceable identification item 130 are captured by the video capturing device 140 to provide the video stream that can be viewable to the buyer.

The step (C) may comprise a step of clearly videotaping the unique identification pattern 132 through a close-up shot so that the buyer is able to clearly view the information of the unique identification pattern 132 in the video stream.

The step (C) may comprise a step of clearly videotaping a purchasing receipt 206 of the targeted product 200, so that the buyer is able to clearly view the information of the unique identification pattern 132 in the video stream.

Alternatively, the system 100 may further comprise a reference medium 160 which can be an electronic product that is able to display at least one of time information, date information, environment data information such as position information, temperature information, air quality information. Particularly, the purchasing receipt 206 has the time and date information about the purchase of the targeted product 200, and the step (C) may further comprise a step of videotaping the reference medium 160 to compare the time and date information shown on the reference medium 160 with the time and date information shown on the purchasing receipt 206.

When the unique and non-replaceable identification item 130 is embodied as a sensor element such a position sensor element, the reference medium 160 such as a cell phone and a computer is videotaped to show corresponding position information on the reference medium 160, so as to prove that the position information on the position sensor element is correct.

In addition, the position information acquired by the reference medium 160, such a position information from a GPS sensor 161 of the reference medium 160, can be sent to the online shopping platform 11, so that the online shopping platform 11 is able to authenticate the position of the designated store for the buyer.

The system 100 may comprise a recording medium 170, the video stream obtained in step (C) can be recorded in the recording medium 170. In the step (D), recording medium 170 is a storage medium that can be distributed to the buyer.

Alternatively, the video stream of the step (C) can be uploaded to the server 110, so that the buyer is able to view the video stream on the online shopping platform 11. For example, the buyer can send a request to the buying agent, and the buying agent receives the request will allow the buyer to watch the video stream through the online shopping platform 11. The buying agent may provide a password code to the buyer, and the buyer may input the password code on the online shopping platform 11 for watching the corresponding video stream associated with the targeted product 200 he or has bought from the buying agent.

Preferably, the video stream is live broadcasted to the buyer. The video capturing device 140 can be installed in the agent terminal 120 which can be communicated to a buyer terminal of the buyer. For example, the agent terminal 120 is a cell phone, and a camera module which is integrally installed in the cell phone functions as the video capturing device 140 to videotaping the process of purchasing the targeted product 200 as well as the process of placing the unique and non-replaceable identification item 130, so that the agent terminal 120 can directly live broadcast the vide stream to the buyer. Alternatively, the video stream is uploaded to the online shopping platform 11 and is live broadcasting to the buyer through the online shopping platform 11. Alternatively, the video capturing device 140 may be installed at the designated store, and the video stream can then be uploaded to the online shopping platform.

In addition, the process of creating the unique identification pattern 132 on the identification item body 131 can also be videotaped. In order words, for example, handwritings for creating the unique identification pattern 132 by the buying agent can be videotaped, so that the process of creating the unique identification pattern 132 is monitored by the buyer.

Accordingly, the step (D) of the present invention may comprise the steps of recording the video stream by the recording medium 170 and broadcasting the video stream to the buyer stored in the recording medium 170. When the recording medium 170 is delivered to the buyer, the buyer is able to have access to the content in the video stream. Alternatively, the step (D) may comprise the steps of uploading the vide stream to the online shopping platform 11 and broadcasting the vide stream to the buyer through the online shopping platform 11. Alternatively, the step (D) may comprise the steps of live broadcasting the vide stream to the buyer through the online shopping platform 11 or through the agent terminal 120 which is communicated to the buyer terminal.

Referring to FIG. 6 of the drawings, the online shopping platform 11 of the system 100 of authenticating genuine products according to the present invention is illustrated. The online shopping platform 11 comprises an information module 111, an order module 112, and an authenticating module 113. The information module 111 is arranged for acquiring and displaying information of the buyer, the targeted product 200, the designated store, and the buying agent. The order module 112 is arranged for generating the online shopping order and informing the buying agent about the online shopping order. The authenticating module 113 is communicated with the order module 112 and is arranged for authenticating the targeted product 200 for the buyer. The sever 110 comprises a processor 1101 and a memory 1102 for implementing the mentioned information displaying step, the order generating step, the order assigning step, and the authenticating step.

More specifically, the information displaying module 111 may comprise an information acquiring module 1111 for acquiring information of the buyer, the targeted product 200, the designated store, and the buying agent, and an information displaying module 1112 for displaying the corresponding information. According to the present invention, the information displaying module 1112 may comprise a buyer displaying module 11121, a product displaying module 11122 for displaying a plurality of selectable products for the buyer to select, a store displaying module 11123 for displaying information of location, available time, available products, and an agent displaying module 11124 for displaying information of location, specialty and available time.

Accordingly, the product displaying module 11122 and the store displaying module 11123 of the online shopping platform 11 can be arranged to display an inventory of the selectable products and corresponding available stores which sell the products for the buyer to select his or her desired targeted product 200, and the buyer may browse the corresponding contents and submit the online shopping order to the online shopping platform 11 by picking out the targeted product 200 at the designated store from the displayed inventory of the plurality of selectable products and making a payment directed to the targeted product 200 at the designated store.

It is worth mentioning that the agent displaying module 11124 is able to display specialty information of the plurality of buying agents, so that the buyer is able to choose his or her desired buying agent which is suitable for buying his or her targeted product 200 according to different specialties of different buying agents.

The order module 112 comprises an order generation module 1121 for generating the online shopping order and an order assignment module 1122 for assigning the online shopping order to the buying agent by informing the buying agent on the agent terminal 120 which is communicated to the server 110 about the online shopping order having information about the buyer, the targeted product 200 and the designated store.

The order generation module 1121 may be configured to comprise an order receiving module 11211 for receiving the online shopping order from the buyer when the buyer completes actions such as clicking and touching actions on the buyer terminal and a payment module 11212 for receiving the payment from the buyer to the buying agent about the service of buying the targeted product 200 for the buyer.

Alternatively, the order generation module 1121 may comprise a request publish module 11213 for the buyer to publish his or her buying request, and when the buying request of the buyer is answered by the buying agent, and the buyer make a payment to the buying request through the payment module 1122. The order generation module 1121 then generates the online shopping order.

The order assignment module 1122 may comprise an order informing module 11221 for directly displaying the online shopping order for the buying agent to view. The order assignment module 1122 may further comprise a notification module 11222 for sending a notification message to an buyer account registered on the online shopping platform 11 to remind the buying agent to view the online shopping order, or a transmission module 11223 for sending the information of the online shopping order to the agent terminal 120 through a wireless communication network that communicates the sever 110 with the agent terminal 120.

In an alternative mode, the payment module 11212 may receive the payment for requesting the buying agent to go to the designated store for showing products of the designated store to the buyer in a live broadcasting video and the order generation module 1121 may be configured to comprise an live order generation module 11213 for generating the online shopping order in a live manner when the buyer notifies the buying agent that he or she decides to buy a certain desired targeted product and made payment to the live shopping order through the payment module 11212.

The authenticating module 113 comprise an instruction generation module 1131 which is communicated to the order module 112 for acquiring information of the online shopping order and generates an instruction authenticating command, a video acquiring module 1132 communicated to the instruction generation module 1131 to receive the instruction authenticating command for activating the video capturing device 140 to videotape at least one of the steps of purchasing the targeted product 200 by the buying agent at the designated store and placing the unique and non-replaceable identification item 130 to provide a video stream, and a video sharing module 1133 for sharing the video stream uploaded to the sever 110 to the buyer upon request from the buyer on the online shopping platform 11.

Preferably, the authenticating module 113 comprise a live broadcasting module 1134 for live broadcasting the steps of purchasing the targeted product 200 by the buying agent at the designated store and placing the unique and non-replaceable identification item 130, so that the buyer is able to real-time monitor the buying process of the targeted product 200 by the buying agent.

The authenticating module 113 may comprise a store location informing module 1135 which comprises a location acquiring module 11351 for acquiring location information of the designated store when the buying agent is in the designated store for buying the targeted product 200 for the buyer through the agent terminal or the reference medium 160.

Figure 20:
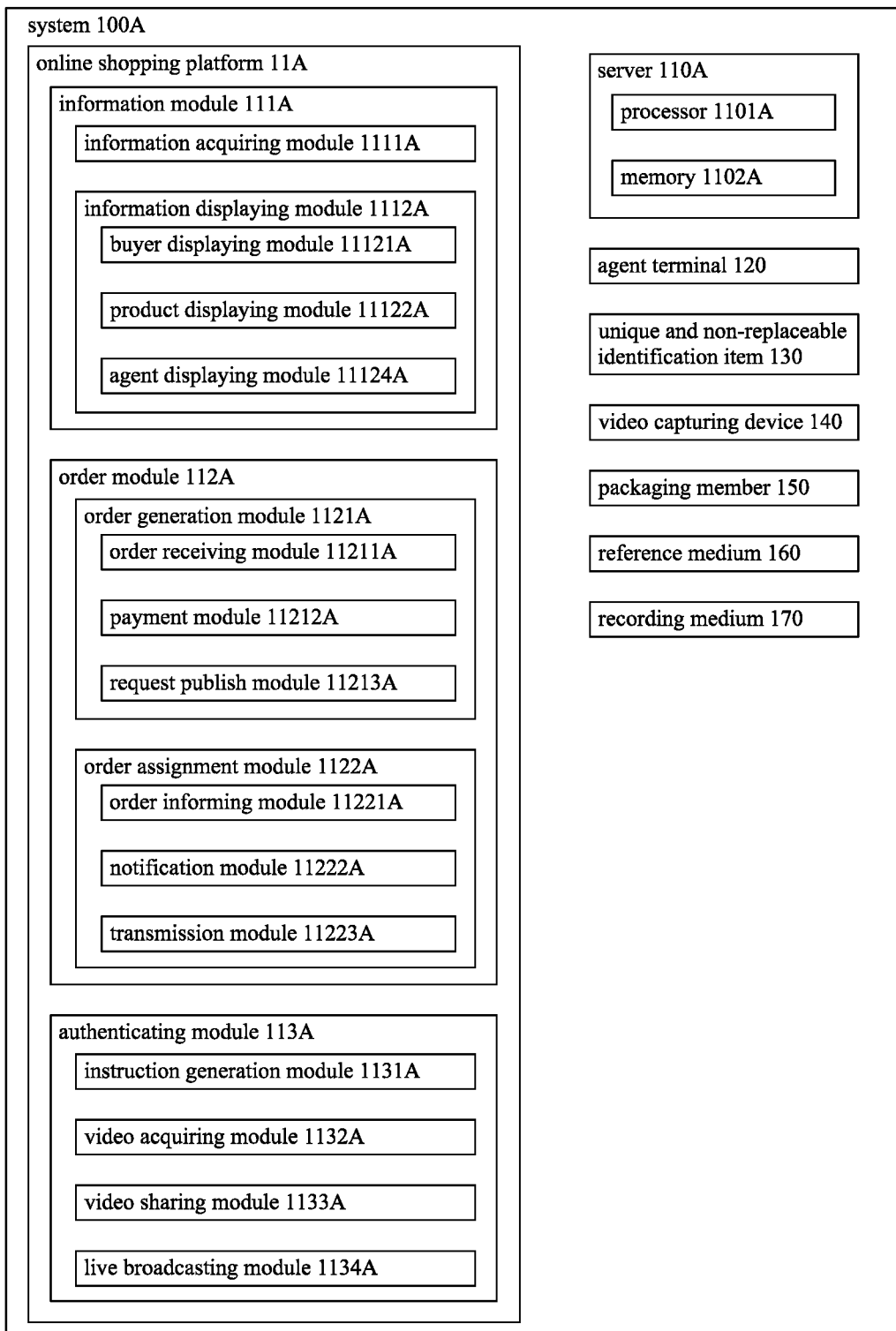
FIG. 20 is a schematic diagram illustrating an online shopping system which implements the method of authenticating genuine products according to the above third preferred embodiment of the present invention.

Referring to FIGS. 19 and 20 of the drawings, a system 100A and a method of authenticating a genuine product for an online shopping platform 11A on a server 110A according to a third preferred embodiment of the present invention are illustrated. Accordingly, an online store sells the targeted product 200 which is not shipped to the buyer who is located at a buyer geographical area, but can be shipped to the buy agent who is located at an agent geographical area, the buyer may designate the buying agent to buy the targeted product 200 of the designated online store for him or her and then ship the targeted product 200 to him or her.

The system 100A comprises a sever 110A providing the online shopping platform 11A, an agent terminal 120 which is capable of being communicated and linked to the server 110A, a unique and non-replaceable identification item 130 arranged for identification of the targeted product 200 which is purchased from the designated online store which sells the targeted product 200, a video capturing device 140, and the method comprises the following steps:

(I) giving a unique identification mark to the targeted product 200 which is bought from the designated online store by the unique and non-replaceable identification item 130;

(II) videotaping at least one of the steps of receiving the targeted product 200 which is shipped to the buying agent and placing the unique and non-replaceable identification item 130 by the video capturing device 140 to provide a video stream; and (III) allowing the buyer to have access to the video stream.

The targeted product 200 can be bought from the designated online store by the buyer but the buyer submits a shipment address which is an address of the buying agent. When the targeted product 200 is shipped to the buying agent, the steps of receiving the targeted product 200 and placing the unique and non-replaceable identification item 130 are videotaped so that the buyer can view the video stream and be confident that the targeted product 200 he or she buys is a genuine product.

The targeted product 200 also can be bought from the designated online store by the buying agent. The online shopping platform 11A may receive an online shopping order having information about the buyer, the targeted product 200 and the designated online store and assign the online shopping order to the buying agent. The buying agent then can buy the targeted product 200 from the designated online store, and the purchase of the targeted product 200 from the designated online store also can be videotaped.

Accordingly, the method may further comprise the steps of receiving the online shopping order having information about the buyer, the targeted product 200 and the designated online store and videotaping the step of making an order of buying the targeted product 200 on the designated online store.

As mentioned above, the unique and non-replaceable identification item 130 can be disposed in or attached to the targeted product 200, or disposed in or attached to the packaging member 150.

In addition, the targeted product 200 may be further packaged by a packing material which is provided by a logistics service provider, the method may further comprise a step of videotaping the step of packaging the targeted product by the logistics service provider.

In the step (III), similarly, the video stream can be stored in the recording medium 170 and mailed to the buyer. Alternatively, the video stream is uploaded to the sever 110A and is accessible to the buyer through online shopping platform 11A. Preferably, the step (III) may comprise the steps of live broadcasting the vide stream to the buyer through the online shopping platform 11A or through the agent terminal 120 which is communicated to the buyer terminal.

The online shopping platform 11A comprises an information module 111A, an order module 112A, and an authenticating module 113A. The information module 111A is arranged for acquiring and displaying information of the buyer, the targeted product 200, the designated online store, and the buying agent. The order module 112A is arranged for generating the online shopping order and informing the buying agent about the online shopping order. The authenticating module 113A is communicated with the order module 112A and is arranged for authenticating the targeted product 200 for the buyer. The sever 110A comprises a processor 1101A and a memory 1102A for implementing the mentioned information displaying step, the order generating step, the order assigning step, and the authenticating step.

The information displaying module 111A may comprise an information acquiring module 1111A for acquiring information of the buyer, the targeted product 200, the designated online store, and the buying agent, and an information displaying module 1112A for displaying the corresponding information. According to the present invention, the information displaying module 1112A may comprise a buyer displaying module 11121A, a product displaying module 11122A for displaying a plurality of selectable products for the buyer to select or a link to the designated online store, and an agent displaying module 11124A for displaying information of location, specialty and available time.

The order module 112A comprises an order generation module 1121A for generating the online shopping order and an order assignment module 1122A for assigning the online shopping order to the buying agent by informing the buying agent on the agent terminal 120 which is communicated to the server 110A about the online shopping order having information about the buyer, the targeted product 200 and the designated online store.

The order generation module 1121A may be configured to comprise an order receiving module 11211A for receiving the online shopping order from the buyer and a payment module 11212A for receiving the payment from the buyer to the buying agent about the service of buying the targeted product 200 on the designated online store for the buyer. The order generation module 1121A may comprise a request publish module 11213A for the buyer to publish his or her buying request, and when the buying request of the buyer is answered by the buying agent, and the buyer make a payment to the buying request through the payment module 1122A. The order generation module 1121A then generates the online shopping order.

The order assignment module 1122A may comprise an order informing module 11221A for directly displaying the online shopping order for the buying agent to view. The order assignment module 1122A may further comprise a notification module 11222A for sending a notification message to an buyer account registered on the online shopping platform 11A to remind the buying agent to view the online shopping order, or a transmission module 11223A for sending the information of the online shopping order to the agent terminal 120 through a wireless communication network that communicates the sever 110A with the agent terminal 120.

The authenticating module 113A comprise an instruction generation module 1131A which is communicated to the order module 112A for acquiring information of the online shopping order and generates an instruction authenticating command, a video acquiring module 1132A communicated to the instruction generation module 1131A to receive the instruction authenticating command for activating the video capturing device 140 to videotape at least one of the steps of receiving the targeted product 200 by the buying agent and placing the unique and non-replaceable identification item 130 by the video capturing device 140 to provide a video stream, and a video sharing module 1133A for sharing the video stream uploaded to the sever 110A to the buyer upon request from the buyer on the online shopping platform 11A.

Preferably, the authenticating module 113A comprise a live broadcasting module 1134A for live broadcasting the steps of receiving the targeted product 200 by the buying agent and placing the unique and non-replaceable identification item 130, so that the buyer is able to real-time monitor the receiving process of the targeted product 200 as well as the process of placing the unique and non-replaceable identification item 130 by the buying agent. When the targeted product 200 is bought from the designated online store by the buying agent. The live broadcasting module 1134A may further be configured for live broadcasting the purchase of the targeted product 200 from the designated online store by the buying agent.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A system of authenticating a targeted product which is bought by a buying agent at a designated store for a buyer, comprising:
a sever configured for providing an online shopping platform;
an agent terminal which is linked to said server to receive an online shopping order having information about the buyer, the targeted product and the designated store;
a unique and non-replaceable identification item arranged for identification of the targeted product and for forming a unique and non-replaceable identification pattern on the unique and non-replaceable identification item; and
a video capturing device for capturing steps of purchasing the targeted product by the buying agent at the designated store, placing said unique and non-replaceable identification item and forming the unique and non-replaceable identification pattern on the unique and non-replaceable identification item to provide a video stream that is provided for being viewed by the buyer, wherein the video stream is live broadcasting through a predetermined communication network allowing the buyer monitoring during the steps of purchasing the target product by the buying agent at the designated store, placing said unique and non-replaceable identification item and forming the unique and non-replaceable identification pattern on the unique and non-replaceable identification item.

2. The system, as recited in claim 1, wherein said unique and non-replaceable identification item comprise an identification item body, wherein the unique identification pattern is formed on the identification item body for unique and distinguishable identification of the targeted product, wherein the video stream being live broadcasting through the predetermined communication network also allows the buyer to monitor during the unique identification pattern being formed on the identification item body for unique and distinguishable identification of the targeted product.

3. The system, as recited in claim 2, wherein said unique and non-replaceable identification item is arranged for being disposed into the targeted product.

4. The system, as recited in claim 3, wherein said unique and non-replaceable identification item is arranged for being attached to the targeted product.

5. The system, as recited in claim 2, further comprising a packaging member for packaging the targeted product, wherein said unique and non-replaceable identification item is arranged for being disposed into the packaging member.

6. The system, as recited in claim 2, further comprising a packaging member for packaging the targeted product, wherein said unique and non-replaceable identification item is arranged for being attached to said packaging member.

7. The system, as recited in claim 2, wherein said unique identification pattern contain one or more information about the targeted product, the designated store, the buyer, and the buying agent.

8. The system, as recited in claim 2, wherein said identification item body is a fastener that is capable of being fastened to the targeted product.

9. The system, as recited in claim 8, wherein said fastener comprises a fastening portion, a locking portion having a locking hole, and an identification portion that is arranged for forming said unique identification pattern thereon, wherein said fastening portion passes through said looking hole and is locked with said locking portion.

10. The system, as recited in claim 8, wherein said fastening portion comprises a plurality of spaced apart locking threads, wherein one or more of said locking threads are retained at said locking portion, so as to lock said fastening portion with said locking portion.

11. The system, as recited in claim 9, wherein the targeted product comprises a connector having a hole, wherein said fastener is capable of being fastened to the connector by passing through the hole and fixing said fastening portion with said locking portion to form a loop structure.

12. The system, as recited in claim 9, wherein the targeted product comprises a handle and a connector mounted at the handle, wherein the connector has a hole, wherein said fastener is capable of being fastened to the connector by passing through the hole and fixing said fastening portion with said locking portion, so as to retain said unique and non-replaceable identification item at the connector of the targeted product.

13. The system, as recited in claim 9, wherein the targeted product comprises a strap, wherein said fastener is capable of being fastened to the strap forming a loop structure which is wound around the strap.

14. The system, as recited in claim 9, wherein the targeted product comprises a strap, wherein said fastener is capable of being fastened to the strap forming a loop structure which is wound around the strap.

15. The system, as recited in claim 6, wherein said identification item body is a fastener that is capable of being fastened to said packaging member, wherein said fastener comprises a fastening portion, a locking portion having a locking hole, and an identification portion that is arranged for forming said unique identification pattern thereon, wherein said fastening portion passes through said looking hole and is locked with said locking portion.

16. The system, as recited in claim 1, wherein said unique and non-replaceable identification item is a sensor element which is selected from a group consisting of a position sensor element, a temperature sensor element, a humidity sensor element, an air quality sensor element, a gyro element, an image sensor element, and a pressure sensor element.

17. The system, as recited in claim 1, wherein said unique and non-replaceable identification item is selected from one of a fastener and a packaging member which is subject to one-time usage.

18. The system, as recited in claim 1, wherein said video capturing device is installed in said agent terminal.

19. The system, as recited in claim 1, wherein said sever is configured for the live broadcasting of the video stream obtained by said video capturing device to the buyer.

20. The system, as recited in claim 1, wherein said agent terminal is configured for the live broadcasting of the video stream obtained by said video capturing device to the buyer.

21. The system, as recited in claim 1, further comprising a reference medium which is arranged for being videotaped by said video capturing device and is arranged for providing information selected from the group consisting of date, time, and location.

22. A method of authenticating a targeted product which is bought by a buying agent at a designated store for a buyer, comprising:
(A) informing the buying agent on an agent terminal which is communicated to a server about an online shopping order having information about the buyer, the targeted product and the designated store;
(B) giving a unique identification mark to the targeted product, which is bought from the designated store, by a unique and non-replaceable identification item;
(C) capturing steps of purchasing the targeted product by the buying agent at the designated store, placing the unique and non-replaceable identification item and forming a unique and non-replaceable pattern on the unique and non-replaceable identification item by a video capturing device to provide a video stream; and
(D) allowing the buyer to have access to the video stream by live broadcasting the video stream through a predetermined communication network allowing the buyer monitoring during the steps of purchasing the targeted product by the buying agent at the designated store, placing the unique and non-replaceable identification item and forming the unique and non-replaceable pattern on the unique and non-replaceable identification item.

23. The method, as recited in claim 22, wherein the step (B) further comprises a step of forming the unique identification pattern on an identification item body for forming the unique and non-replaceable identification item that is arranged for unique and distinguishable identification of the targeted product, wherein in the step (D), the video stream being live broadcasting through the predetermined communication network also allows the buyer to monitor during the unique identification pattern being formed on the identification item body for unique and distinguishable identification of the targeted product.

24. The method, as recited in claim 22, wherein the step (B) comprises a step which is selected from the group consisting of a step of disposing the unique and non-replaceable identification item in the targeted product, a step of attaching the unique and non-replaceable identification item to the targeted product, a step of disposing the unique and non-replaceable identification item in a packaging member for packaging the targeted product, and a step of attaching the unique and non-replaceable identification item to a packaging member for packaging the targeted product.

25. The method, as recited in claim 23, wherein the step (C) comprises a step of clearly videotaping the unique identification pattern through a close-up shot, so as to allow the buyer to clearly view information of the unique identification pattern in the video stream.

26. The method, as recited in claim 23, wherein the step (C) comprises a step of clearly videotaping a purchasing receipt of the targeted product through a close-up shot.

27. The method, as recited in claim 23, further comprising a step of providing a real-time location information of buying agent in the designated store obtained by a GPS sensor to allow the buyer to confirm that the buying agent is in the designated store.

28. The method, as recited in claim 22, further comprising the steps of displaying a plurality of products in the designated store by the buying agent and generating the online shopping order in a live manner when a payment is made to the targeted product.

29. A method of authenticating a targeted product which is bought at a designated online store for a buyer, comprising the steps of:
(I) giving a unique identification mark to the targeted product which is bought from the designated online store by a unique and non-replaceable identification item;
(II) capturing steps of receiving the targeted product which is shipped to a buying agent, placing the unique and non-replaceable identification item and forming a unique and non-replaceable pattern on the unique and non-replaceable identification item by a video capturing device to provide a video stream; and
(III) allowing the buyer to have access to the video stream of the steps of receiving the targeted product which is shipped to a buying agent, placing the unique and non-replaceable identification item and forming the unique and non-replaceable pattern on the unique and non-replaceable identification item through a predetermined communication network.

30. The method, as recited in claim 29, wherein the step (I) further comprises a step of forming the unique identification pattern on an identification item body for forming the unique and non-replaceable identification item that is arranged for unique and distinguishable identification of the targeted product.

31. The method, as recited in claim 30, wherein the step (I) comprises a step which is selected from the group consisting of a step of disposing the unique and non-replaceable identification item in the targeted product, a step of attaching the unique and non-replaceable identification item to the targeted product, a step of disposing the unique and non-replaceable identification item in a packaging member for packaging the targeted product, and a step of attaching the unique and non-replaceable identification item to a packaging member for packaging the targeted product.

32. The method, as recited in claim 30, wherein the step (III) comprises a step of live broadcasting the video stream through the predetermined communication network to allow the buyer to monitor the steps of receiving the targeted product which is shipped to the buying agent, placing the unique and non-replaceable identification item and forming the unique and non-replaceable identification pattern on the unique and non-replaceable identification item.

33. The method, as recited in claim 30, wherein the step (II) further comprises a step of videotaping a step of making an order of buying the targeted product on the designated online store, wherein the order is made by the buying agent.

34. The method, as recited in claim 30, wherein the step (II) further comprises a step of videotaping the step of forming the unique identification pattern on the identification item body for forming the unique and non-replaceable identification item that is arranged for unique and distinguishable identification of the targeted product to provide the video stream, and the step (III) further comprises a step of live broadcasting the video stream through the predetermined communication network to allow the buyer to monitor the step of forming the unique identification pattern on the identification item body for forming the unique and non-replaceable identification item that is arranged for unique and distinguishable identification of the targeted product.

* * * * *